(12) United States Patent
Wakitani et al.

(10) Patent No.: US 7,911,734 B2
(45) Date of Patent: Mar. 22, 2011

(54) SPINDLE MOTOR WITH A MAGNETIC SHIELD PLATE HAVING AN INCLINED ANNULAR FACE

(75) Inventors: Akihiko Wakitani, Ehime (JP); Shigeo Obata, Hyogo (JP)

(73) Assignee: Panasonic Corporation, Osaka (JP)

( * ) Notice: Subject to any disclaimer, the term of this patent is extended or adjusted under 35 U.S.C. 154(b) by 1019 days.

(21) Appl. No.: 11/523,659

(22) Filed: Sep. 20, 2006

(65) Prior Publication Data

US 2007/0217064 A1    Sep. 20, 2007

(30) Foreign Application Priority Data

Mar. 20, 2006 (JP) ................... 2006-076326

(51) Int. Cl.
*G11B 5/11* (2006.01)
*H02K 5/00* (2006.01)

(52) U.S. Cl. .................. 360/99.08; 310/51; 310/67 R; 360/97.02

(58) Field of Classification Search ............... 360/99.08, 360/97.04; 310/216.108, 67 R, 90.5
See application file for complete search history.

(56) References Cited

U.S. PATENT DOCUMENTS

| 6,486,578 | B2 | 11/2002 | Kitahori et al. | |
|---|---|---|---|---|
| 6,549,366 | B1 | 4/2003 | Ichiyama | |
| 2002/0018315 | A1* | 2/2002 | Nii et al. | 360/99.08 |
| 2006/0056105 | A1* | 3/2006 | Eguchi et al. | 360/97.02 |

FOREIGN PATENT DOCUMENTS

| JP | 2000-331460 | | 11/2000 |
|---|---|---|---|
| JP | 2000331460 | * | 11/2000 |
| JP | 2001-76459 | | 3/2001 |

* cited by examiner

*Primary Examiner* — Craig A. Renner
*Assistant Examiner* — Tamara Ashford
(74) *Attorney, Agent, or Firm* — Wenderoth, Lind & Ponack, L.L.P.

(57) ABSTRACT

A disc driving motor of the invention includes a base, a hub having a ring-shaped disc receiving face on which a disc is placed, a hydrodynamic bearing rotatably supporting the hub, a motor unit mounted on the base, the motor unit having an outer diameter larger than that of the disc receiving face and applying a rotational force to the hub, and a magnetic shield plate disposed on an axial clearance formed between the disc and the motor unit when the disc is placed on the disc receiving face. The magnetic shield plate has an opposed face opposed to the disc when the disc is placed on the receiving face, the opposed face being inclined toward the disc receiving face.

5 Claims, 16 Drawing Sheets

SECTION TAKEN ALONG LINE C-C

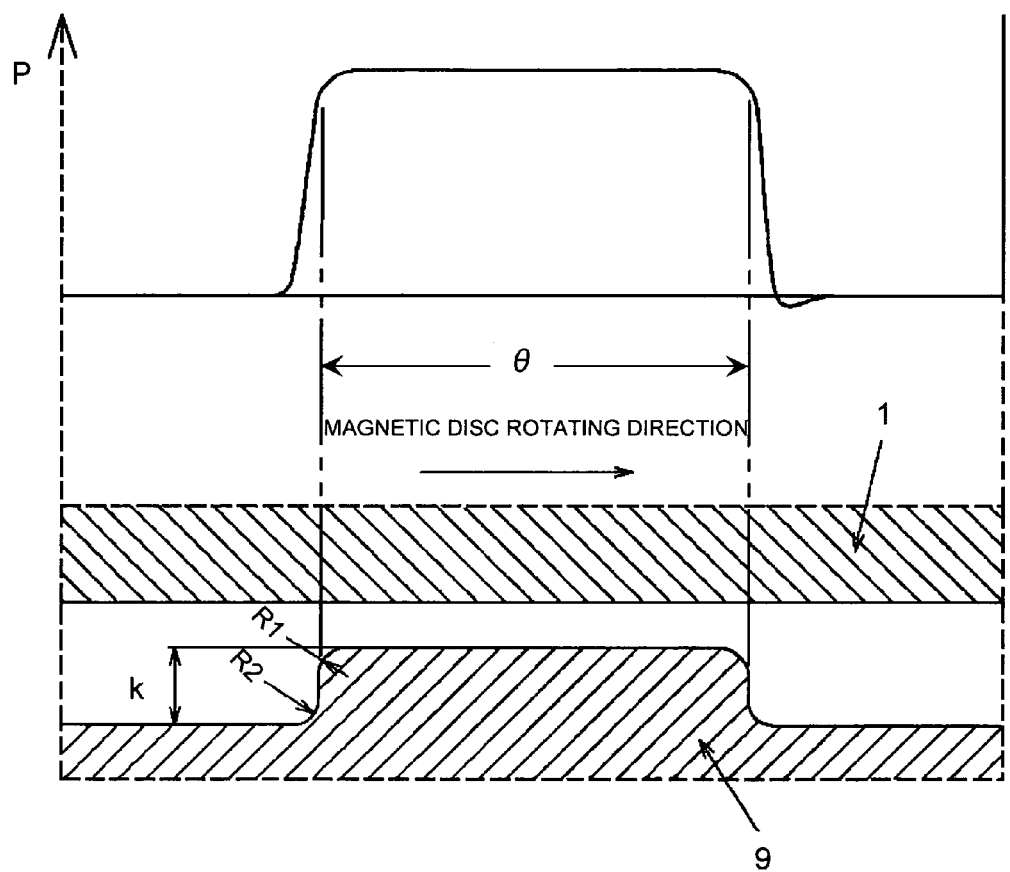

MAGNETIC HEAD ENTERING DIRECTION

MAGNETIC HEAD ENTERING DIRECTION

B POINT          A POINT

τ (DEGREE)

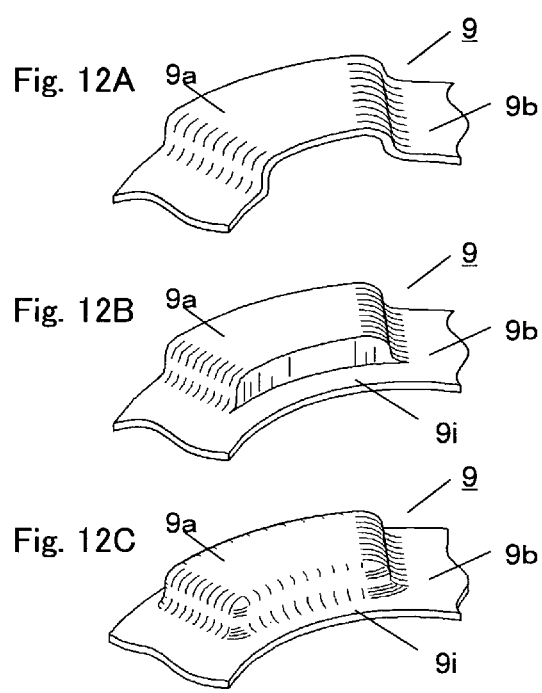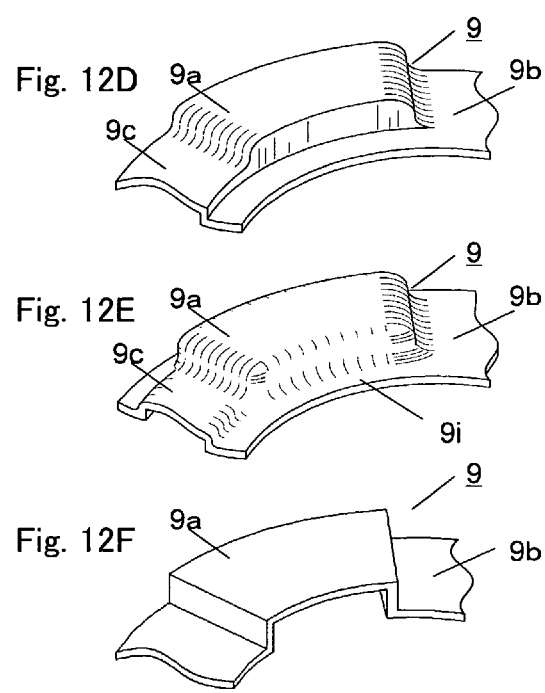

SPINDLE MOTOR WITH A MAGNETIC SHIELD PLATE HAVING AN INCLINED ANNULAR FACE

BACKGROUND OF THE INVENTION

1. Field of the Invention

The present invention relates to a disc driving motor and an information recording and reproducing apparatus including the same. This disc driving motor can rotate a disc without runout by means of dynamic pressure of airflow generated by rotation of the disc, and is mainly used in a hard disc drive (HDD).

2. Description of the Related Art

In recent years, as for an HDD, there has been an increased demand for large storage capacity, high speed operation, low acoustic noise, low power consumption and the like. Hence, prime importance is placed on a technique for suppressing noise in a recording and reproducing head and a technique for stably rotating a disc.

An increase in storage capacity of the HDD is accelerated. As the storage capacity of the drive is increased, a track pitch on a disc becomes narrower. In order to trace the narrow track pitch with reliability, a motor of the HDD must rotate with high accuracy. In particular, an NRRO (Non Repeatable RunOut) property of a motor is indispensable to read a narrow track pitch on a rotating disc with reliability. This reading operation requires high accuracy on the order of sub-micron and, therefore, exerts a large influence on a highly dense storage capacity of an HDD.

Recently, HDDs tend to be installed in personal computers (PC) or audiovisual systems in order to record and reproduce moving images. In the case where an HDD records and reproduces moving images, it is essential that the access speed of the HDD is accelerated in order that a user of a PC or an audiovisual system comfortably plays back the moving images. In order to accelerate the access speed, it is necessary to rotate a motor at high speed.

In some cases, an HDD is reduced in size and thickness and operates a disc having a diameter of not more than 2.5 inches. Such an HDD is incorporated in a mobile device. In this case, it is assumed that a user uses the mobile device in a car or puts the mobile device in his/her pocket upon use. Therefore, it is necessary to improve resistance to external forces such as vibration of the HDD in order that the mobile device normally operates. Hence, the motor for driving the disc requires a resistance to external forces.

As a technique for suppressing noise, for example, U.S. Pat. No. 6,486,578 discloses a configuration that a magnetic shield plate is interposed between a motor unit and a disc (hereinafter, referred to as "conventional configuration 1"). FIG. 13 is an exploded perspective view showing a motor unit of an HDD in the conventional configuration 1. FIG. 14 is a sectional view showing the motor unit. As shown in FIGS. 13 and 14, a stator core 24 having a core winding 8 of plural phases wound there around is fixed onto a base 7. At an inner circumference of the stator core 24, a magnet 23 fixed to a hub 2 is rotatably supported by two ball bearings 21. Further, a magnetic shield plate 9 is fixed onto the stator core 24 and the core winding 8. With this configuration, it is possible to prevent magnetic leakage flux from the motor unit to a head 11 and to suppress noise superimposition with respect to a reproduction signal in the head 11.

As a technique for stably rotating a disc, for example, JP2001-076459A discloses the following configuration (hereinafter, referred to as "conventional configuration 2"). That is, an airflow guide plate is provided in the vicinity of a disc. Airflow is generated in the casing of an HDD by rotation of the disc and, then, is guided such that a pressure thereof is applied to a side face of a hub. Thus, a lateral pressure F is applied to a radial bearing in order to stably rotate the bearing. FIG. 15A is a plan view showing an HDD in the conventional configuration 2 and FIG. 15B is a sectional view showing the HDD. As shown in FIGS. 15A and 15B, an airflow guide plate 32 is interposed between adjacent discs 1. The airflow guide plate 32 has a guide face 32a located at a rear side in a disc rotating direction and formed into an arcuate shape in the vicinity of a hub 2. With this configuration, a rotational center of a rotor is decentered in a certain direction. Thus, it is possible to effectively prevent NRRO and RRO and to enhance rotation accuracy.

Further, JP2000-331460A discloses the following configuration (hereinafter, referred to as "conventional configuration 3"). That is, a squeeze air bearing plate partially having an annular smooth face expanded circumferentially and radially is fixedly provided on a disc so as to oppose a disc face with a clearance of not more than 0.3 mm provided there between; thus, flutter-vibration due to aerodynamic excitation of the disc is suppressed. FIG. 16 is a perspective view showing an HDD in the conventional configuration 3. Herein, in order to stably rotate a disc 1, a squeeze air bearing plate 33 is provided in the vicinity of the disc 1 so that disturbance of airflow around the disc 1 is suppressed. In addition, in order that the airflow becomes smooth around the squeeze air bearing plate 33, an inclined face 34 is formed at an end face of the squeeze air bearing plate 33 so that the end face of the squeeze air bearing plate 33 has a streamlined sectional shape.

In the conventional configuration 1, as shown in FIGS. 13 and 14, for a lead wire 22 from the core winding 8, the magnetic shield plate 9 includes a protrusion portion 9a. On the other hand, in the vicinity of a phase that the head 11 enters, the magnetic shield plate 9 includes a flat portion 9b so as to approach the base 7. It can be understood from the drawings in U.S. Pat. No. 6,486,578 that a step between the protrusion portion 9a and the flat portion 9b has a corner and steeply rises. In addition, an inner circumference portion of the magnetic shield plate 9 is located in the vicinity of the magnet 23, but steeply rises in the conventional configuration 1.

However, the aforementioned steep step causes the following problems. That is, since the step steeply rises, there is a possibility that a vortex 12 is generated at the corner of the step as shown in FIG. 5A. The vortex 12 disturbs a dynamic pressure generated between the disc 1 and the magnetic shield plate 9 to generate a disturbance, so that the dynamic pressure is unstably applied to the disc 1. Thus, there is a possibility that the behavior of the rotor is disturbed. This phenomenon occurs even if the rotational speed is only about 3000 rpm. As the rotational speed increases, the influence of this vortex becomes large.

When disturbance vibration is applied to the rotor including the disc 1, as shown in FIGS. 11A and 11B, relative angular deviation occurs between the head 11 and the disc 1. The head 11 is attached onto a flexible flexure 20, fixed to an actuator arm 19, through a gimbal mechanism (not shown). The head 11 floats by a floating height FH at a predetermined pitch angle θp and a predetermined roll angle θr relative to the disc 1. Herein, if the disc 1 vibrates, inclination of the surface of the disc 1 is disadvantageously changed in a pitch direction as denoted by "1a" or "1b" in FIG. 11A. Further, such inclination is disadvantageously changed in a roll direction as denoted by "1c" or "1d" in FIG. 11B. As a result, a posture of the head 11 relative to the disc 1 is changed disadvantageously, so that the floating height FH of the head 11 varies.

Then, the head 11 comes into contact with the disc 1. Consequently, data recorded on the disc 1 is damaged and, in some cases, stiction occurs between lubricating oil (not shown) applied onto the disc 1 and the head 11, resulting in head crush. Thus, the HDD incurs critical damage. On the other hand, if the floating height FH is made sufficiently large in order to avoid the head crush, a magnetic gap between the head 11 and a magnetic layer on the disc 1 becomes large, resulting in insufficient head reproduction output. Consequently, the HDD incurs considerable restriction about its storage capacity for recordable data. Accordingly, it is necessary to prevent the disc 1 from vibration even when the HDD receives disturbance vibration.

In addition, the inner circumference portion of the magnetic shield plate 9, located in the vicinity of the magnet 23, also steeply rises. Therefore, if magnetic leakage flux from the magnet 23 is cross-linked to the magnetic shield plate 9, concentration of the flux readily occurs at the steeply risen portion and this leads to a disturbance magnetic field in the head 11. Consequently, acoustic noise is readily superimposed on a reproduction signal in the head 11. Further, the magnetic shield plate 9 made of a magnetic material generates cogging torque to thereby become a source of applying vibration to the rotor of the motor, leading to occurrence of NRRO and RRO. This phenomenon is conspicuous in a case of using a magnet having a large energy product, such as a neodymium-iron-boron magnet, for the purpose of achievement in low power consumption. In particular, an influence of the phenomenon becomes large in a case of using a sintered magnet rather than a resin magnet. A magnet having a large energy product generates not only cogging torque but also acoustic noise due to vibration of the magnetic shield plate 9.

In the conventional configuration 2, the disc 1 is sandwiched between the airflow guide plates 32, each having the guide face 32a, in the vertical direction. However, further size reduction is required for a small HDD having a size of not more than 1.8 inches. Hence, such an HDD can be equipped with only one disc. Accordingly, the disc cannot be sandwiched between the airflow guide plates 32. In the small HDD having a size of not more than 1.8 inches, the hub 2 protrudes from the disc 1 by not more than 1 mm and has a complex structure other than a simple cylindrical structure in some cases. Consequently, even when the airflow guide plate 32 is provided at the top face side of the disc 1, airflow is not sufficiently brought into contact with the hub 2, so that an airflow guide effect is not satisfactorily obtained in some cases. Further, in the small HDD having a size of not more than 1.8 inches, there is a space of about 1 mm between the bottom face of the disc 1 and magnetic shield plate 9 in many cases. Herein, in order to provide the airflow guide plate 32 on the magnetic shield plate 9, it is necessary to set the thickness of the airflow guide plate 32 at not more than 1 mm. It is difficult for such a thin airflow guide plate 32 to sufficiently guide airflow. As a result, the airflow guide plate 32 cannot exhibit a satisfactory effect in at least the HDD having a size of not more than 1.8 inches. Further, as shown in FIG. 15B, the guide face 32a of the airflow guide plate 32 is formed perpendicularly to the disc 1; therefore, vortexes are disadvantageously generated above and under the airflow guide plate 32. This vortex becomes a source of applying vibration to the disc, leading to occurrence of NRRO and RRO.

In the conventional configuration 3, the thickness of the squeeze air bearing plate 33 must be set at not more than 1 mm in the HDD having a size of not more than 1.8 inches, as in the conventional configuration 2. However, such a thin squeeze air bearing plate 33 is readily warped. The squeeze air bearing plate 33 fixedly provided on the magnetic shield plate 9 sometimes comes into contact with the bottom face of the disc 1 depending on accumulation of tolerances. Even when the squeeze air bearing plate 33 does not come into contact with the disc 1 in a state that the HDD having a size of not more than 1.8 inches receives no disturbance G, if the HDD is used for mobile application, a mobile device including the HDD receives large impact upon use in some cases. Herein, the disc 1 or the squeeze air bearing plate 33 is deformed, so that contact between the disc 1 and the squeeze air bearing plate 33 may occur. In order to prevent this contact, it is necessary to design the mobile device in sufficient consideration of height tolerance and flatness of the magnetic shield plate 9 and the squeeze air bearing plate 33. However, if a clearance is provided between the squeeze air bearing plate 33 and the disc 1 in order to prevent contact between the squeeze air bearing plate 33 and the disc 1, a squeeze air bearing effect cannot be obtained satisfactorily. In addition, if an HDD must be reduced in size and thickness as is the HDD having a size of not more than 1.8 inches, provision of the squeeze air bearing plate 33 above the disc 1 causes difficulty in allocation of an area for such provision. Further, a space above the disc 1 is limited; therefore the provision is actually difficult in view of variations in flatness and height tolerance of the squeeze air bearing plate 33.

The squeeze air bearing plate 33 has a complex shape and, therefore, is made of a resin or a material that can be subjected to pressing such as forging. In general, such a material has a low surface hardness and is readily damaged. In view of this disadvantage, the squeeze air bearing plate 33 includes the inclined face 34 such that airflow becomes smooth there around. Thus, the squeeze air bearing plate 33 can be sharpened. However, since the squeeze air bearing plate 33 is made of a relatively soft material as described above, the sharp end face is readily damaged. If the squeeze air bearing plate 33 is scratched, airflow is disturbed due to the scratch, so that a vortex is generated. As a result, flutter-vibration of the disc 1 increases and acoustic noise is generated. Accordingly, it is necessary to treat the squeeze air bearing plate 33 carefully or perform surface curing treatment such as Ni plating on the squeeze air bearing plate 33 upon manufacturing of the squeeze air bearing plate 33 or assembly of a drive. This leads to increase in cost.

Herein, it is considered that the squeeze air bearing plate 33 is provided under the disc 1. However, the HDD having a size of not more than 1.8 inches has a small allowance in a thickness direction; therefore, the squeeze air bearing plate 33 can not be interposed between the motor unit and the disc 1. Further, it is considered that a component similar in shape to the squeeze air bearing plate 33 is provided on the base 7. However, it is necessary to reduce an outer diameter of the motor unit because the disc 1 in the small-size HDD must have a small outer diameter in order to configure the squeeze air bearing plate on the base 7 at an outer circumference of the motor. This leads to an increase in power consumption in the motor unit since electromagnetic conversion efficiency of the motor deteriorates.

SUMMARY OF THE INVENTION

The present invention is devised to solve the aforementioned conventional problems. An object of the present invention is to provide a disc driving motor having the following advantages, and an information recording and reproducing apparatus including the same. This disc driving motor can rotate a disc without runout and achieve low acoustic noise and low power consumption with a simple configuration. The disc driving motor is mainly used in an HDD.

In order to achieve the aforementioned object, according to a first aspect of the present invention, a disc driving motor includes a base, a hub, a hydrodynamic bearing, a motor unit and a magnetic shield plate. The hub has a ring-shaped disc receiving face on which a disc is placed. The hydrodynamic bearing rotatably supports the hub. The motor unit is mounted on the base, has an outer diameter larger than that of the disc receiving face, and gives a rotational force to the hub. The magnetic shield plate is provided on an axial clearance formed between the disc and the motor unit when the disc is placed on the disc receiving face. The magnetic shield plate is fixed while being inclined to the disc receiving face such that the pressure of airflow in the axial clearance differs for each circumferential position upon rotation of the disc.

Herein, description will be given of one example of the disc driving motor having a configuration that there is a relative inclination relation between the disc and the magnetic shield plate.

Conventionally, various configurations have been proposed for a magnetic shield plate in order to secure operation of a high-performance HDD. In order to realize a small-size, high-performance motor, however, it is necessary to prevent runout of a disc with high accuracy.

In the disc driving motor according to the present invention, the magnetic shield plate that suppresses disturbance of airflow without provision of a steep step is fixed while being inclined in an axial direction in such a manner that a moment for inclining the magnetic shield plate in a certain direction is applied to the disk. When the disc is rotated, a dynamic pressure is applied to a rotor, so that a lateral pressure is applied to the hydrodynamic bearing. Thus, a behavior of the rotor can be stabilized.

In the present invention, the magnetic shield plate has no step bent steeply; therefore, a cogging force generated between the magnetic shield plate and a magnet can be made minimum. Further, vibration and acoustic noise due to cogging can be suppressed. Upon loading of the disc, the magnetic shield plate opposing a bottom face of the disc is fixed while being inclined to the disc. Therefore, a vortex is hardly generated in regard to an airflow generated between the disc and the magnetic shield plate upon rotation of the disc. Further, a pressure of the airflow is changed smoothly. As a result, an axial load is applied onto the disc at a portion where a clearance between the disc and the magnetic shield plate is narrow, so that a force to incline the entire rotor in a certain direction is generated. Concurrently, the hydrodynamic bearing is enhanced in stiffness; therefore, increase in NRRO and RRO can be suppressed.

Accordingly, it is possible to obtain a disc driving motor capable of achieving high performance, low acoustic noise and low power consumption with a simple configuration.

According to a second aspect of the present invention, an information recording and reproducing apparatus includes the aforementioned disc driving motor and a head. The head is provided so as to oppose a disc, and information is recorded on and reproduced from the disc when the head performs scanning on the disc.

Herein, description will be given of the information recording and reproducing apparatus including the aforementioned disc driving motor.

In the present invention, the axial clearance between the disc and the magnetic shield plate is smoothly changed in an almost sine wave form. Further, a vortex is hardly generated in regard to an airflow generated between the disc and the magnetic shield plate upon rotation of the disc, and a pressure of the airflow is changed smoothly. As a result, an axial load is applied onto the disc at a portion where a clearance between the disc and the magnetic shield plate is narrow, so that a force to incline the entire rotor in a certain direction is generated, and the behavior of the rotor is stabilized. Concurrently, the hydrodynamic bearing is enhanced in stiffness; therefore, increase in NRRO and RRO can be suppressed.

Accordingly, it is possible to obtain an information recording and reproducing apparatus with good accuracy.

According to a third aspect of the present invention, in the information recording and reproducing apparatus according to the second aspect of the present invention, the magnetic shield plate is inclined to the disc receiving face such that an axial distance between the magnetic shield plate and the disk over a region where the head performs no scanning becomes shorter than an axial distance between the magnetic shield plate and the disk over a region where the head performs scanning.

Herein, description will be given of one spatial relation of the axial clearance between the magnetic shield plate and the disc.

In the present invention, when a clearance other than a magnetic head scanning region is made smaller, disturbance of airflow can be suppressed.

Accordingly, it is possible to obtain an information recording and reproducing apparatus capable of rotating a disc more stably.

According to a fourth aspect of the present invention, in the information recording and reproducing apparatus according to the second aspect of the present invention, the magnetic shield plate is inclined such that an axial distance becomes short toward a direction almost orthogonal to a tangent drawn from a rotational center of the disc with respect to a scanning locus arc of the head, in the axial clearance between the magnetic shield plate and the disc.

Herein, description will be given of another spatial relation of the axial clearance between the magnetic shield plate and the disc.

In the present invention, a posture of the head relative to the disc in a pitch direction can be stabilized. As a result, a head floating height becomes stable. Even when a slider of the head is designed with a smaller floating height, frequency that the head comes into contact with the disc can be reduced.

Accordingly, it is possible to obtain an information recording and reproducing apparatus capable of achieving reduction in size, improvement in high-density recording, and increase in storage capacity.

According to a fifth aspect of the present invention, a disc driving motor includes a base, a hub, a hydrodynamic bearing, a motor unit and a magnetic shield plate. The hub has a ring-shaped disc receiving face on which a disc is placed. The hydrodynamic bearing rotatably supports the hub. The motor unit is mounted on the base, has an outer diameter larger than that of the disc receiving face, and gives a rotational force to the hub. The magnetic shield plate is provided on a first axial clearance formed between the disc and motor unit when the disc is placed on the disc receiving face. In a second axial clearance formed between the magnetic shield plate and the disc, the magnetic shield plate includes at least two planes. The planes are different from each other in one of an axial height and an inclining direction relative to the disc receiving face and are smoothly connected to each other in a circumferential direction such that a pressure of an airflow generated between the magnetic shield plate and the disc upon rotation of the motor unit differs for each circumferential position.

Herein, description will be given of another example of the disc driving motor having a configuration that there is a relative inclination relation between the disc and the magnetic shield plate.

Conventionally, there have been proposed various configurations for a magnetic shield plate in order to secure operation of a high-performance HDD. In order to realize a small-size, high-performance motor, however, it is necessary to prevent runout of a disc with high accuracy.

In the disc driving motor according to the present invention, the magnetic shield plate in the second axial clearance formed between the magnetic shield plate and the disc includes at least two planes such that a pressure differs for each circumferential position.

In the present invention, the magnetic shield plate has no step bent steeply; therefore, a cogging force generated between the magnetic shield plate and a magnet can be made minimum. Further, vibration and acoustic noise due to cogging can be suppressed. Upon loading of the disc, the magnetic shield plate opposing a bottom face of the disc includes at least two planes different in axial height or inclination from each other such that an axial clearance between the magnetic shield plate and the disc differs for each circumferential position. Therefore, a vortex is hardly generated in regard to an airflow generated between the disc and the magnetic shield plate upon rotation of the disc. Further, a pressure of the airflow is changed smoothly. As a result, an axial load is applied onto the disc at a portion where a clearance between the disc and the magnetic shield plate is narrow, so that a force to incline the entire rotor in a certain direction is generated. Concurrently, the hydrodynamic bearing is enhanced in stiffness; therefore, increase in NRRO and RRO can be suppressed.

Accordingly, it is possible to obtain a disc driving motor capable of achieving high performance, low acoustic noise and low power consumption with a simple configuration.

According to a sixth aspect of the present invention, in the disc driving motor according to the fifth aspect of the present invention, the magnetic shield plate in the second axial clearance includes a step. The step has different axial heights and is rounded in the circumferential direction so as to have corner radii.

Herein, description will be given of another shape of the magnetic shield plate in the second axial clearance.

In the present invention, a vortex is hardly generated because a change in channel resistance is small in regard to an airflow generated between the disc and the magnetic shield plate upon rotation of the disc. Further, a pressure of the airflow is changed smoothly. As a result, an axial load is applied to a portion where a clearance between the disc and the magnetic shield plate is narrow, so that a force to incline the entire rotor in a certain direction is generated. Concurrently, the hydrodynamic bearing is enhanced in stiffness; therefore, increase in NRRO and RRO can be suppressed. In addition, the magnetic shield plate has no step bent steeply; therefore, a cogging force generated between the magnetic shield plate and a magnet can be made minimum. Further, vibration and acoustic noise generated due to cogging can be suppressed.

Accordingly, it is possible to obtain a disc driving motor capable of achieving high performance, low acoustic noise and low power consumption with a simple configuration.

According to a seventh aspect of the present invention, in the disc driving motor according to the sixth aspect of the present invention, when a corner radius with a positive curvature located at a near side from the disc receiving face in the axial direction is R1 and a corner radius with a negative curvature located at a far side from the disc receiving face in the axial direction is R2 in the magnetic shield plate in the second axial clearance, a relation, R1 > R2, is satisfied.

Herein, description will be given of a relation of a connection portion between the at least two planes.

In the present invention, the disc driving motor has no step bent steeply; therefore, a cogging force generated between the magnetic shield plate and a magnet can be made minimum. Further, vibration and acoustic noise due to cogging can be suppressed. In addition, the corner radius R1 corresponding to an inlet where a channel becomes narrow upon loading of the disc is set larger, so that channel resistance becomes small by loose contraction. Thus, a vortex can be prevented from being generated and the behavior of the rotor can be stabilized.

Accordingly, it is possible to obtain a stable, high-performance disc driving motor.

According to an eighth aspect of the present invention, in the disc driving motor according to the fifth aspect of the present invention, the magnetic shield plate has an innermost circumference portion formed into a single ring-shaped plane.

Herein, description will be given of a configuration that the innermost circumference portion of the magnetic shield plate is formed into the single ring-shaped plane, that is, the magnetic shield plate is formed into a deeply drawn shape.

In the present invention, the magnetic shield plate is improved in stiffness, so that vibration of the magnetic shield plate can be suppressed.

Accordingly, it is possible to obtain a disc driving motor capable of achieving low acoustic noise and low vibration.

According to a ninth aspect of the present invention, in the disc driving motor according to the fifth aspect of the present invention, in the second axial clearance, a region where an axial thickness thereof is small is in a range between not less than 87° and not more than 248° in a direction of a circumference.

Herein, description will be given of inclination of the second axial clearance.

In the present invention, a dynamic pressure is stably generated at sufficiently high level, so that rotation of the disc is stabilized.

Accordingly, it is possible to obtain a stable, high-performance disc driving motor.

According to a tenth aspect of the present invention, an information recording and reproducing apparatus includes the disc driving motor according to the fifth aspect of the present invention, and a head. The head is provided so as to oppose the disc, and information is recorded on and reproduced from the disc when the head performs scanning on the disc.

Herein, description will be given of the information recording and reproducing apparatus including the aforementioned disc driving motor.

In the present invention, an axial load is applied to the disc at a portion where a clearance between the disc and the magnetic shield plate is narrow, so that a force to incline the entire rotor in a certain direction can be generated, in the disc driving motor. Concurrently, the hydrodynamic bearing is enhanced in stiffness; therefore, increase in NRRO and RRO can be suppressed.

Accordingly, it is possible to obtain a high-performance information recording and reproducing apparatus.

According to an eleventh aspect of the present invention, in the information recording and reproducing apparatus according to the tenth aspect of the present invention, an axial thickness of the second axial clearance over a region where the head performs no scanning is smaller than an axial thickness of the second axial clearance over a region where the head performs scanning.

Herein, description will be given of the second axial clearance formed between the magnetic shield plate and the disc.

In the present invention, a clearance other than a magnetic head scanning region is made small, so that generation of a dynamic pressure can be suppressed.

Accordingly, it is possible to obtain an information recording and reproducing apparatus capable of rotating a disc more stably.

According to a twelfth aspect of the present invention, in the information recording and reproducing apparatus according to the tenth aspect of the present invention, an axial thickness in a direction almost orthogonal to a tangent drawn from a rotational center of the disc with respect to a scanning locus arc of the head is smallest in the magnetic shield plate in the second axial clearance.

Herein, description will be given of a spatial relation of the axial clearance between the magnetic shield plate and the disc.

In the present invention, a posture of the head relative to the disc in a pitch direction can be stabilized. As a result, a head floating height becomes stable. Even when a slider of the head is designed with a smaller floating height, frequency that the head comes into contact with the disc can be reduced.

Accordingly, it is possible to obtain an information recording and reproducing apparatus capable of achieving reduction in size, improvement in high-density recording, and increase in storage capacity.

According to a thirteenth aspect of the present invention, in the information recording and reproducing apparatus according to the tenth aspect of the present invention, an axial thickness of the second axial clearance over a portion corresponding to an arcuate scanning locus of the head is larger than an axial thickness of the second axial clearance over a portion located almost opposite to the portion when being seen from a rotational center of the disc.

Herein, description will be given of another spatial relation of the axial clearance between the magnetic shield plate and the disc.

In the present invention, a posture of the head relative to the disc in a roll direction can be stabilized. As a result, a head floating height is stabilized. Even when a slider of the head is designed with a smaller floating height, frequency that the head comes into contact with the disc can be reduced.

Accordingly, it is possible to obtain an information recording and reproducing apparatus capable of achieving reduction in size, improvement in high-density recording, and increase in storage capacity.

According to the present invention, the disc driving motor and the information recording and reproducing apparatus including the same can achieve the following remarkable effects. That is, a magnetic shield plate of a motor is formed into an appropriate shape, so that a behavior of a rotor can be stabilized upon rotation of a disc at high speed. Further, resistance to external forces such as vibration can be improved. In addition, it is possible to provide a motor capable of stably rotating a disc to thereby contribute to increase in storage capacity and improvement in high-density recording. Moreover, a behavior of the rotor can be stabilized by a change in shape of the magnetic shield plate. Further, increase in cost can be suppressed and reduction in thickness can be realized without addition of new components.

BRIEF DESCRIPTION OF THE DRAWINGS

FIG. 6 schematically shows a pressure in the second embodiment of the present invention;

FIGS. 12A to 12C are perspective views each showing a protrusion portion of the magnetic shield plate in a modification of the second embodiment of the present invention, FIGS. 12D and 12E are perspective views each showing a protrusion portion of a magnetic shield plate in a modification of the fourth embodiment of the present invention, and FIG. 12F is a perspective view showing a protrusion portion of a magnetic shield plate in the conventional configuration 1;

DETAILED DESCRIPTION OF THE INVENTION

Hereinafter, description will be given of embodiments of the present invention with reference to the drawings.

First Embodiment

Figure 1A:
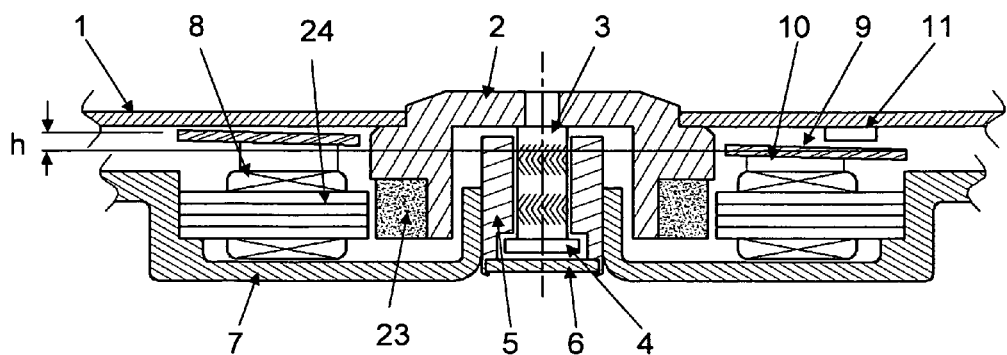
FIG. 1A is a sectional view showing a motor unit of an HDD in a first embodiment of the present invention.

FIG. 1A is a sectional view showing a motor unit of an HDD in a first embodiment.

A disc 1 is placed on a hub 2 through a clamper (not shown). A magnet 23 magnetized so as to have plural poles is fixedly attached to a lower end of the hub 2. A shaft 3 supports the hub 2. A flange 4 is fixed to an end of the shaft 3 by means of laser welding, caulking, crimping press fitting, bonding or the like. The shaft 3 is inserted into a sleeve 5, and a thrust plate 6 is fixed to an end face of the sleeve 5 so as to oppose the flange 4. The thrust plate 6 is fixed by means of caulking or the like.

Dynamic pressure grooves are formed on one of a circumferential face of the shaft 3 opposing the sleeve 5 and a circumferential face of the sleeve 5 opposing the shaft 3; thus, a radial dynamic pressure bearing is formed. In addition, dynamic pressure grooves are formed on one of a face of the flange 4 opposing the thrust plate 6 and a face of the thrust plate 6 opposing the flange 4; thus, a thrust dynamic pressure bearing is formed. Each bearing is filled with lubricating oil (not shown). Upon rotation of a motor, the lubricating oil generates a dynamic pressure; thus, a rotor is supported.

The sleeve 5 is fixed by adhesion to a base 7. Further, a stator core 24 is fixed by adhesion to the base 7 so as to oppose the magnet 23 with a radial clearance interposed there between. In addition, a core winding 23 is wound; thus, a so-called inner rotor-type motor is formed. On a core winding 8, a magnetic shield plate 9, to which an insulating seal 10 is stuck in order to achieve insulation from the core winding 8, is fixed by adhesion. The magnetic shield plate 9 is formed by punching (pressing). The magnetic shield plate 9 is made of a ferrite-based stainless material or a martensite-based stainless material in view of prevention of magnetic leakage flux from a motor magnetic circuit and prevention of formation of rust. In the magnetic shield plate 9, a region other than a region where a magnetic head 11 performs scanning is fixed by adhesion onto the core winding 8 so as to have an inclination h in order that a clearance between the disc 1 and the magnetic shield plate 9 becomes narrow.

Figure 2A:
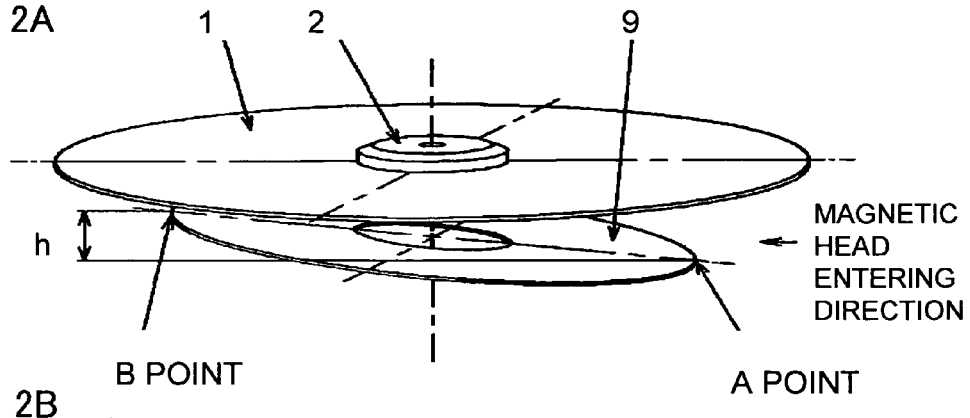
FIG. 2A is a perspective view showing the first embodiment of the present invention, FIG. 2B schematically shows a pressure difference in the first embodiment of the present invention.

FIG. 2A is a perspective view showing a state that a relative inclination h is established between the disc 1 and the magnetic shield plate 9 in the first embodiment. As for the clearance between the disc 1 placed on the hub 2 and the magnetic shield plate 9, the magnetic shield plate 9 is inclined such that a region where the magnetic head 11 performs no scanning is smaller in clearance than a region where the magnetic head 11 performs scanning. Herein, a minimum point of inclination of the magnetic shield plate 9 in a direction that the magnetic head 11 enters is referred to as a point A, and a maximum point of the inclination is referred to as a point B.

Figure 2B:
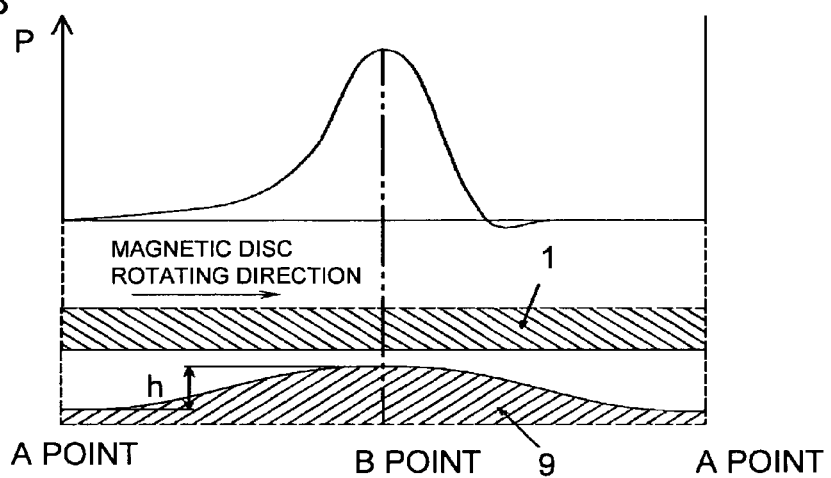
FIG. 2C is a plan view showing a disc driving motor according to the first embodiment of the present invention.

FIG. 2B schematically shows a relation between positions of the rotating disc 1 and the magnetic shield plate 9 in FIG. 2A and a pressure difference. In FIG. 2B, a horizontal axis represents the position of the magnetic shield plate 9, and a vertical axis represents the pressure difference p between the disc 1 and the magnetic shield plate 9. The pressure difference p becomes maximum at the point B.

When $\Delta H$ represents a clearance between the disc 1 and the magnetic shield plate 9, p represents a viscosity of gas and S represents a rotational speed of the motor, a pressure p generated between the disc 1 and the magnetic shield plate 9 is expressed as follows.

$$p \propto \rho * S / \Delta H^2 \quad (1)$$

When $\Delta H_A$ and $\Delta H_B$ represent a maximum clearance and a minimum clearance each formed between the disc 1 and the magnetic shield plate 9 fixed with the inclination h, the pressure difference p generated at a the clearance between the disc 1 and the magnetic shield plate 9 is expressed as follows.

$$p \propto \rho * S * (1/\Delta H_B^2 - 1/\Delta H_A^2) \quad (2)$$

In FIG. 2B, the pressure difference p is shown while the point A is used as a reference and becomes maximum at the point B where the clearance between the disc 1 and the magnetic shield plate 9 formed by the inclination h becomes minimum. If the inclination h is equal to zero, the minimum clearance $\Delta H_B$ is equal to the maximum clearance $\Delta H_A$. Thus, it is clear from the expression (2) that the pressure difference p is equal to zero.

Figure 3:
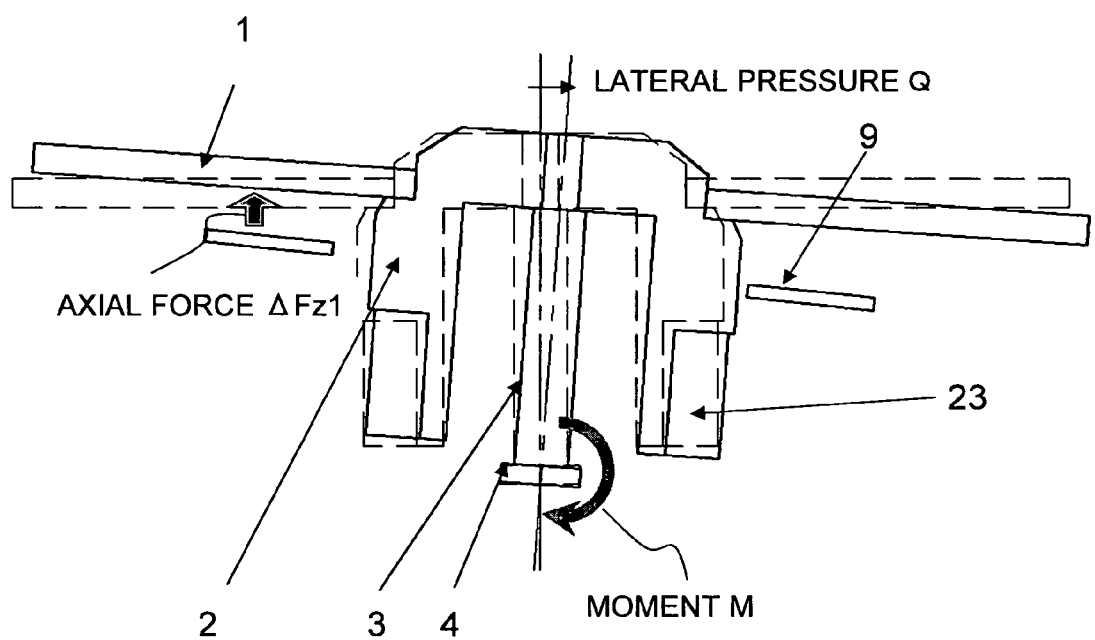
FIG. 3 schematically shows a rotor in the first embodiment of the present invention.

FIG. 3 schematically shows the rotor of the motor. The hub 2 having the disc 1 placed thereon is fixed to the shaft 3, and the flange 4 is fixed to the end of the shaft 3. In the first embodiment, when the pressure p is generated, a lateral pressure Q is applied to an upper portion of the rotor in a radial direction toward a position on an opposite side by almost 180°. Concurrently, a moment M is generated so as to incline the rotor. Each of the lateral pressure Q and the moment M is almost proportional to the pressure p. When the lateral pressure Q is applied in the radial direction, a rotational center of the shaft 3 is decentered in a certain direction, and its decentered state is maintained. In general, the radial bearing has stiffness increased as an eccentricity ratio increases. Therefore, application of the lateral pressure Q causes increase in stiffness of the radial bearing. Concurrently, an inclination is generated at the thrust bearing, so that anti-moment stiffness of the thrust bearing is increased.

With this configuration, upon rotation of the disc 1, the pressure difference p becomes maximum at a position where the clearance between the disc 1 and the magnetic shield plate 9 becomes minimum because the inclined magnetic shield plate 9 is fixed by adhesion to the core winding 8. By the pressure difference p, the lateral pressure Q is applied to the rotor in the radial direction and the moment M allows the rotor to incline in a certain direction. Therefore, the lateral pressure Q is applied to the radial dynamic pressure bearing and the moment is applied to the thrust bearing, so that the stiffness in each of the radial bearing and the thrust bearing is enhanced. As a result, a behavior of the rotor can be stabilized; therefore, increase in NRRO and RRO can be suppressed effectively and resistance to external forces such as vibration can be improved. It is clear from the expression (2) that the pressure difference p increases and the lateral pressure Q becomes large as the rotor rotates at high speed. Therefore, the stiffness of the radial bearing is enhanced and an effect thereof becomes more conspicuous. In addition, the magnetic shield plate 9 has no steep step in the circumferential direction; therefore, a vortex is hardly generated and disturbance in airflow that makes rotation of the disc 1 unstable hardly occurs.

Further, a cogging force generated between the magnetic shield plate 9 and the magnet 23 can be made minimum and, also, vibration and acoustic noise due to cogging in the magnetic shield plate 9 and the rotor can be suppressed.

Figure 1B:
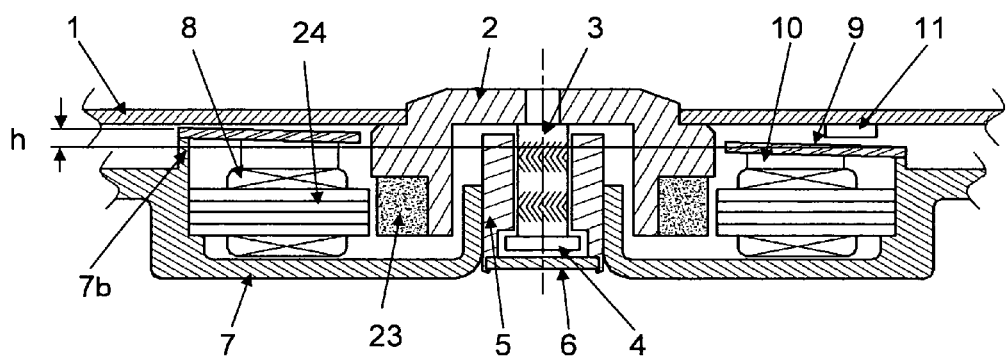
FIGS. 1B and 1C are sectional views each showing the motor unit of the HDD in a modification of the first embodiment of the present invention.
Figure 1C:
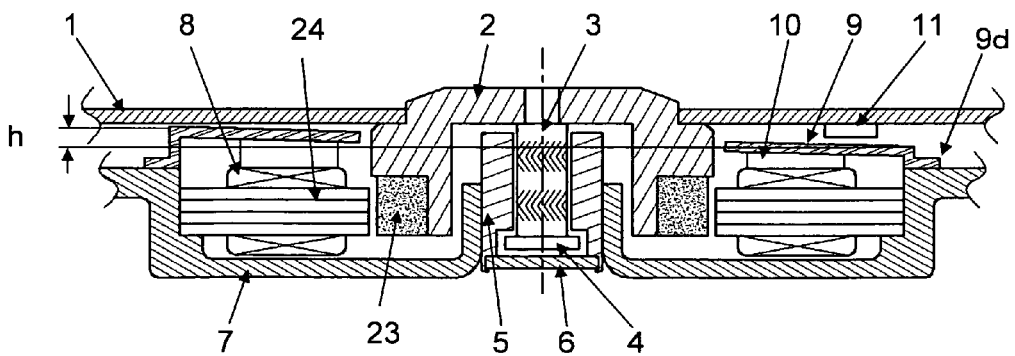

As described above, the magnetic shield plate 9 is fixed onto the core winding 8 through the insulating seal 10. However, as shown in FIG. 1B, an outer peripheral base of the stator core 24 is extended while being inclined in an axial direction to form an adhesion inclination table 7b, and the magnetic shield plate 9 may be fixed by adhesion onto the adhesion inclination table 7b. With this configuration, the outer periphery of the magnetic shield plate 9 is fixed; thus, vibration of the magnetic shield plate 9 can be suppressed. Alternatively, as shown in FIG. 1C, the outer periphery of the magnetic shield plate 9 is drawn by pressing to form a flange portion 9d, and the flange portion 9d may be fixed by adhesion to the base 7. With this configuration, the magnetic shield plate 9 is improved in strength; thus, vibration thereof can be suppressed.

Figure 2C:
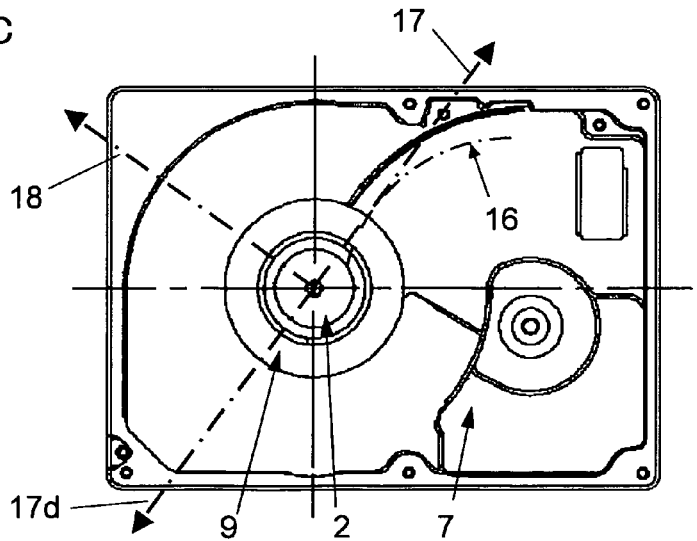

The magnetic shield plate 9 is not necessarily to be inclined in a direction that an axial distance between the disc 1 and the magnetic shield plate 9 becomes maximum. In order to suppress vibration of the disc 1 in a pitch angle direction relative to the head 11, as shown in FIG. 2C, a tangent drawn from a rotational center of the disc 1 with respect to a head scanning locus arc 16 (i.e., a direction orthogonal to a head scanning locus tangent 17 or a direction of a head scanning locus orthogonal line 18) is determined in such a manner that the axial distance between the disc 1 and the magnetic shield plate 9 becomes minimum. In the head 11, generally, the floating height FH largely varies with respect to vibration in the pitch angle direction. The inclining direction of the magnetic shield plate 9 is determined as described above; thus, the floating height FH of the head 11 can be prevented from being varied and high-density recording can be performed.

Second Embodiment

Figure 4A:
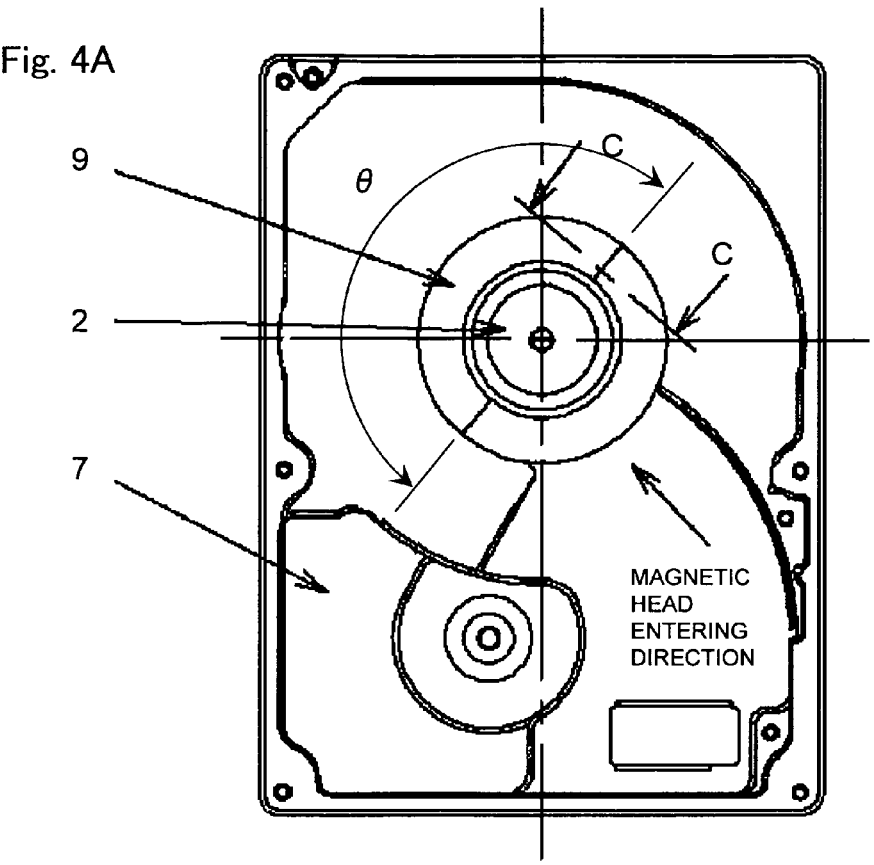
FIG. 4A is a plan view showing a second embodiment of the present invention.

FIG. 4A is a plan view showing a motor unit of an HDD in a second embodiment.

Figure 4B:
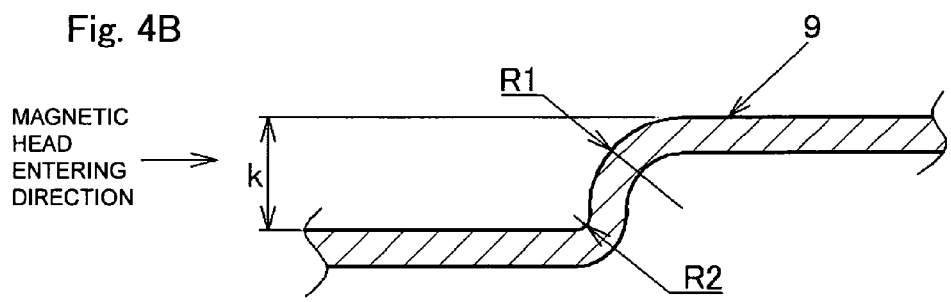
FIG. 4B is a lateral sectional view showing a step of a magnetic shield plate in the second embodiment of the present invention.

As shown in FIG. 4B taken along a line C-C in FIG. 4A, a magnetic shield plate 9 has a step k in an axial direction at a position other than a magnetic head scanning region. The step k is rounded by corner radii R1 and R2. A region where an axial clearance between a disc 1 and the magnetic shield plate 9 becomes narrower has an opening angle θ of about 180°.

Figure 5A:
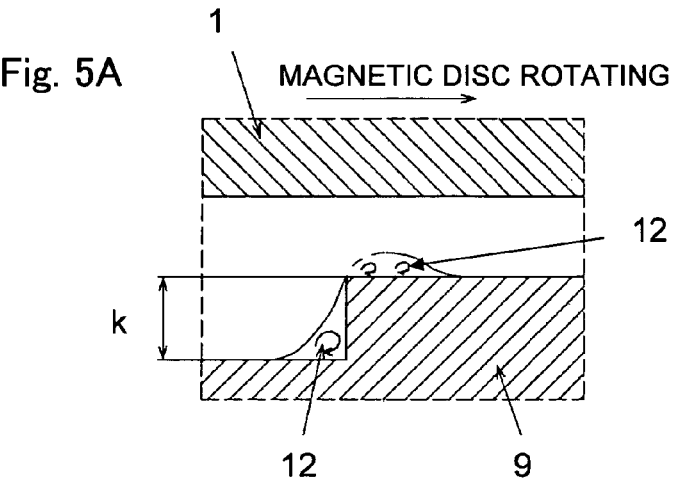
FIG. 5A schematically shows a vortex generated at a step of the magnetic shield plate in a case that the step has a corner, FIG. 5B schematically shows a vortex generated at a step of the magnetic shield plate in a case that the step is tapered, and FIG. 5C schematically shows a vortex generated at a step of the magnetic shield plate in a case that the step has a corner radius.
Figure 5B:
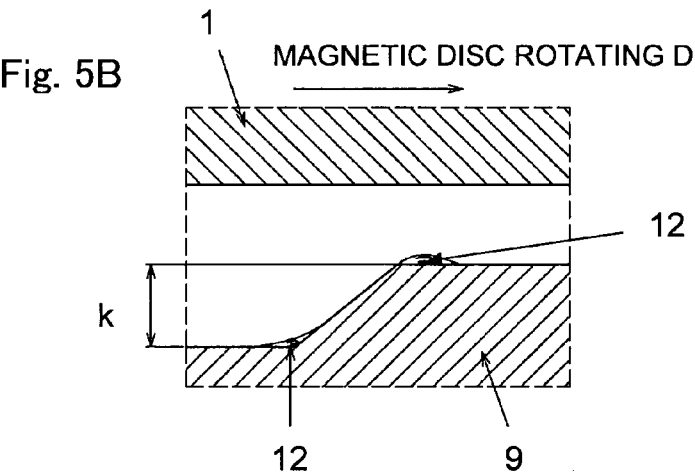
Figure 5C:
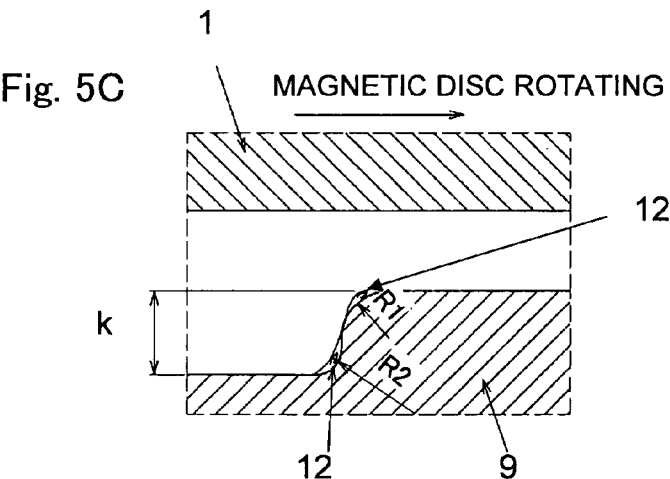

FIGS. 5A to 5C schematically show a state that the step of the magnetic shield plate 9 generates a vortex at an airflow generated upon rotation of the disc 1. FIG. 5A shows a case that the step k of the magnetic shield plate 9 is steep and is not rounded. This steep step k generates vortexes 12 around corners thereof. The vortexes 12 are also generated at an upper portion of the step k where a dynamic pressure is high. The vortex 12 induces disturbance that disturbs airflow in the clearance between the disc 1 and the magnetic shield plate 9 and makes a behavior of a rotor unstable. FIG. 5B shows a case that the step k of the magnetic shield plate 9 is formed into a tapered shape so that generation of the vortex 12 is suppressed. FIG. 5C shows a case that the step k of the magnetic shield plate 9 is rounded so as to have two corner radii so that generation of the vortex 12 is suppressed. Herein, when the corner radius with a positive curvature located at an upper face of the step k is represented as R1 and the corner radius with a negative curvature located at a lower face of the step k is represented as R2, a relation, R1>R2, is satisfied. It is more desirable when both conditions R1>2·R2 and R1>0.2 mm are satisfied. Thus, an inlet of a narrow channel is changed gently, so that generation of the vortex 12 is suppressed, occurrence of disturbance is prevented, and a dynamic pressure to be applied to the disc 1 is stabilized. As a result, a behavior of the rotor can be stabilized.

FIG. 6 schematically shows a relation between the positions of the rotating disc 1 and the magnetic shield plate 9 in FIGS. 4A and 4B and the pressure difference. In FIG. 6, a horizontal axis represents the position of the magnetic shield plate 9, and a vertical axis represents the pressure difference p between the disc 1 and the magnetic shield plate 9. The step k has corner radii R1 and R2 at its inlet. By the step k, the pressure difference p becomes large at a region where the clearance between the disc 1 and the magnetic shield plate 9 becomes small. In the first embodiment, a portion where the pressure difference is large is acted as a line on the disc 1 as the point B shown in FIG. 2B. However, such a portion is acted as a plane on the disc 1 as an area θ shown in FIG. 6 in the second embodiment.

Hence, the lateral pressure Q to be applied to the radial bearing increases, and the bearing stiffness of the rotor also increases.

When $\Delta H$ represents a clearance between the disc 1 and the magnetic shield plate 9, $\rho$ represents a viscosity of gas and S represents a rotational speed of the motor, a pressure p generated at the clearance between the disc 1 and the magnetic shield plate 9 is expressed as the aforementioned expression (1).

The magnetic shield plate 9 is fixed with the step k provided therefor. Herein, $\Delta H_B$ represents a minimum clearance between the disc 1 and the magnetic shield plate 9, and θ represents an opening angle of a region in the minimum clearance. Then, a pressure $p_A$ at the maximum clearance and a pressure $p_B$ at the minimum clearance are expressed as follows, respectively.

$$p_A \propto \rho * S/(\Delta H_B + k)^2 \quad (3)$$

$$p_B \propto \rho * S/(\Delta H_B)^2 \quad (4)$$

Figure 7A:
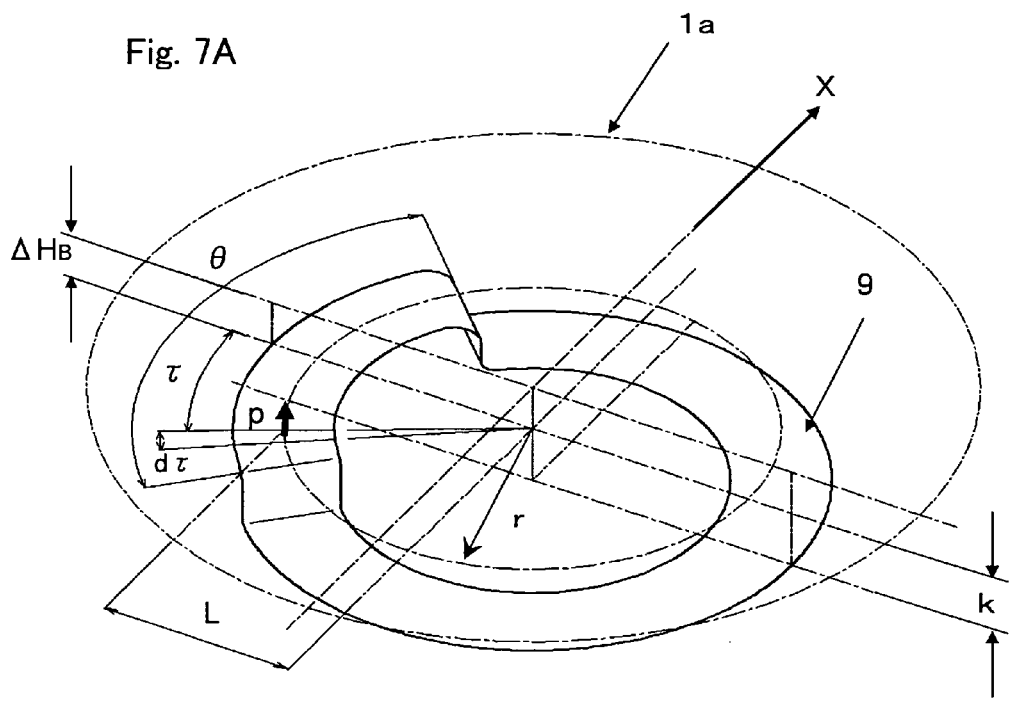
FIG. 7A shows a moment about an X axis by a dynamic pressure in the second embodiment of the present invention.

In FIG. 7A, when r represents a typical average radius of the magnetic shield plate 9, a moment $M_X$ about an X axis by the pressures $p_A$ and $p_B$ is expressed as follows.

$$M_X \propto \int_0^{2\pi} pLr\,d\tau = 2\int_0^{\pi} pr\cos(\tau)r\,d\tau = 2r^2 \int_0^{\pi} p\cos(\tau)\,d\tau \quad (5)$$

$$\propto 2\rho * S * r^2 \left[ \int_0^{\frac{\theta}{2}} \frac{\cos(\tau)}{\Delta H_B^2} d\tau + \int_{\frac{\theta}{2}}^{\pi} \frac{\cos(\tau)}{(\Delta H_B + k)^2} d\tau \right]$$

$$= 2\rho * S * r^2 \sin\left(\frac{\theta}{2}\right)\left[\frac{1}{\Delta H_B^2} - \frac{1}{(\Delta H_B + k)^2}\right]$$

Figure 7B:
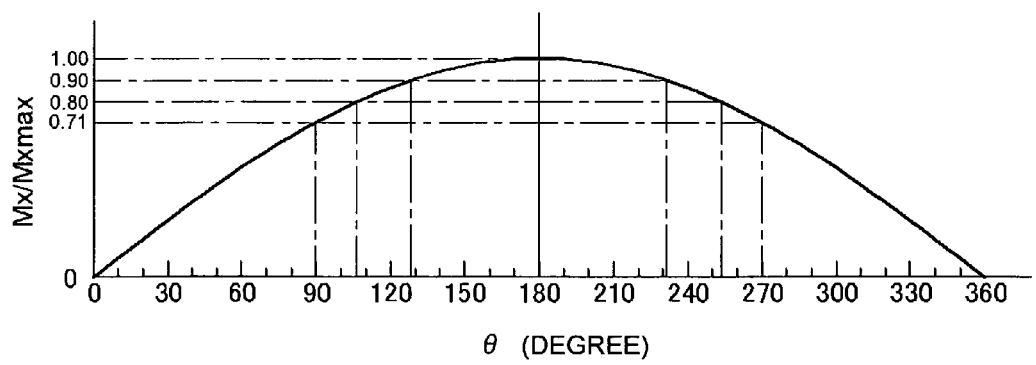
FIG. 7B shows a relation between the moment about the X axis by the dynamic pressure in the second embodiment of the present invention and an opening angle θ.

Accordingly, as shown in FIG. 7B, the moment $M_X$ by the dynamic pressure generated at the clearance between the disc 1 and the magnetic shield plate 9 has a maximum value $M_{Xmax}$ when the opening angle θ is equal to 180°. Herein, when the opening angle θ falls within a range between 90° and 270°, the moment $M_X$ can be increased to a value not less than 71% of the maximum value $M_{Xmax}$. When the opening angle θ falls within a range between 106° and 254°, the moment $M_X$ can be increased to a value not less than 80% of the maximum value $M_{Xmax}$. Further, when the opening angle θ falls within a range between 128° and 232°, the moment $M_X$ can be increased to a value not less than about 90% of the maximum value $M_{Xmax}$. Accordingly, the opening angle θ desirably falls within a range between not less than 90° and not more than 270°, more desirably between 106° and 254°, most desirably between 128° and 232°.

In consideration of calculation results (see FIG. 9B) in a third embodiment (to be described later), if the opening angle θ falls within a range between 90° and 248° without depending on an embodiment, the moment $M_X$ can be increased to a value not less than 71% of the maximum value $M_{Xmax}$. If the opening angle θ falls within a range between 106° and 227°, the moment $M_X$ can be increased to a value not less than 80% of the maximum value $M_{Xmax}$. If the opening angle θ falls within a range between 125° and 198°, the moment $M_X$ can be increased to a value not less than about 90% of the maximum value $M_{Xmax}$.

With the configuration in this embodiment, as shown in FIG. 6, it is possible to obtain a dynamic pressure with a high peak to be applied to the disc 1. Therefore, the lateral pressure Q and the moment M each applied to the radial bearing can be made larger and, also, the peak of the dynamic pressure can be made smooth, so that the lateral pressure can be further stabilized. As a result, the behavior of the rotor can be stabilized, so that increase in NRRO and RRO can be suppressed effectively and resistance to external forces such as vibration can be improved.

In addition, the step k of the magnetic shield plate 9 is rounded in the circumferential direction; therefore, the magnetic leakage flux from the magnet 23 generates no large cogging force. Therefore, there is no possibility that the rotor vibrates and the magnetic shield plate 9 generates acoustic noise. Further, magnetic flux is not concentrated on an edge portion; therefore, a noise magnetic field exerting an adverse influence on the head is not generated.

In the aforementioned description, as shown in FIG. 12A, the step of the magnetic shield plate 9 has a single height at an identical phase without depending on its radius position. However, as shown in FIGS. 12B and 12C, the magnetic shield plate 9 may have a single ring-shaped plane at its innermost circumference portion 9i identical in height to a flat portion 9b. With this configuration, it is possible to absolutely prevent occurrence of cogging and generation of magnetic noise.

Third Embodiment

Figure 8A:
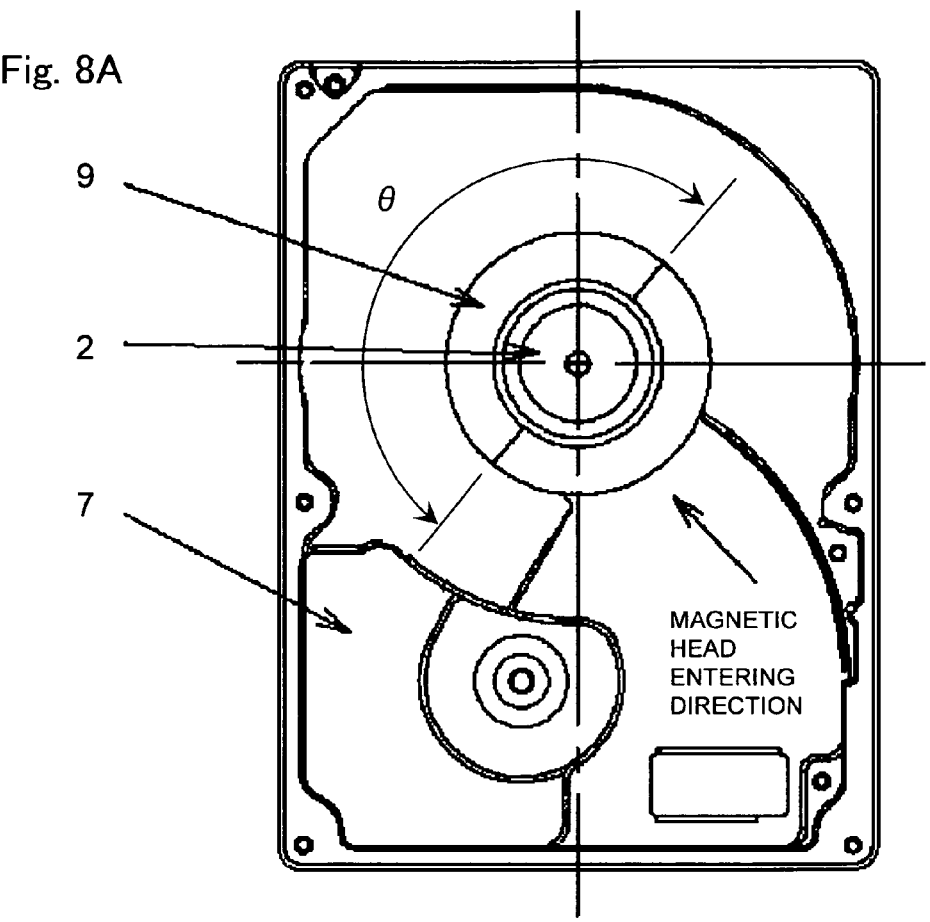
FIG. 8A is a plan view showing a disc driving motor according to a third embodiment of the present invention.
Figure 8B:
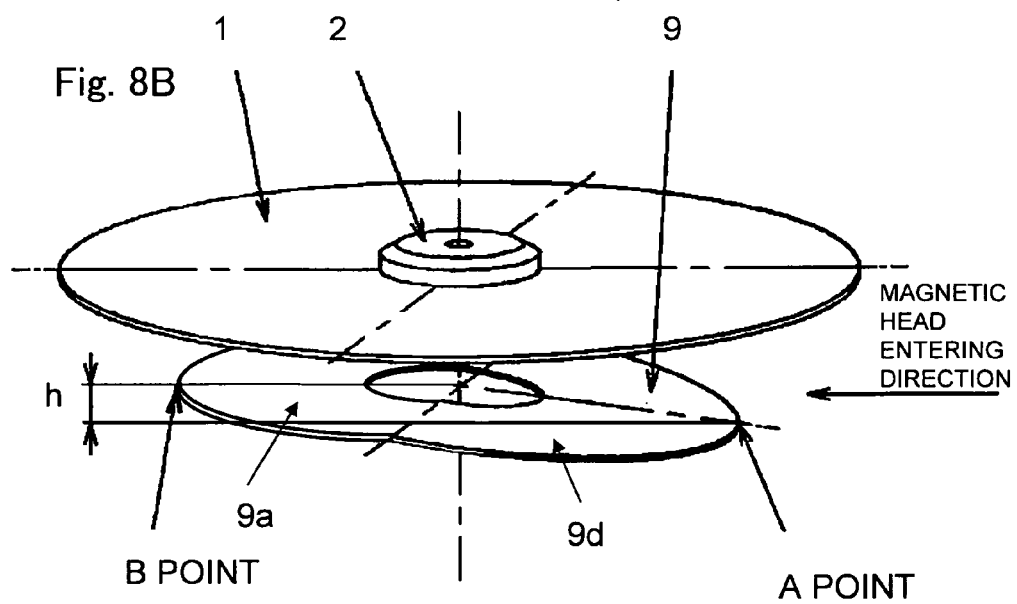
FIG. 8B is a perspective view showing the third embodiment of the present invention.

FIG. 8A is a plan view showing an HDD in a third embodiment, and FIG. 8B is a perspective view showing the HDD.

A magnetic shield plate 9 includes two planes: a protrusion portion 9a parallel to a disc 1, and an inclined face 9d. Herein, the two planes are smoothly connected to each other. With this configuration, a moment to be applied to the disc 1 can be made large. In addition, a behavior of a rotor can be stabilized without occurrence of disturbance. Therefore, increase in NRRO and RRO can be effectively suppressed and resistance to external forces such as vibration can be improved.

Figure 9A:
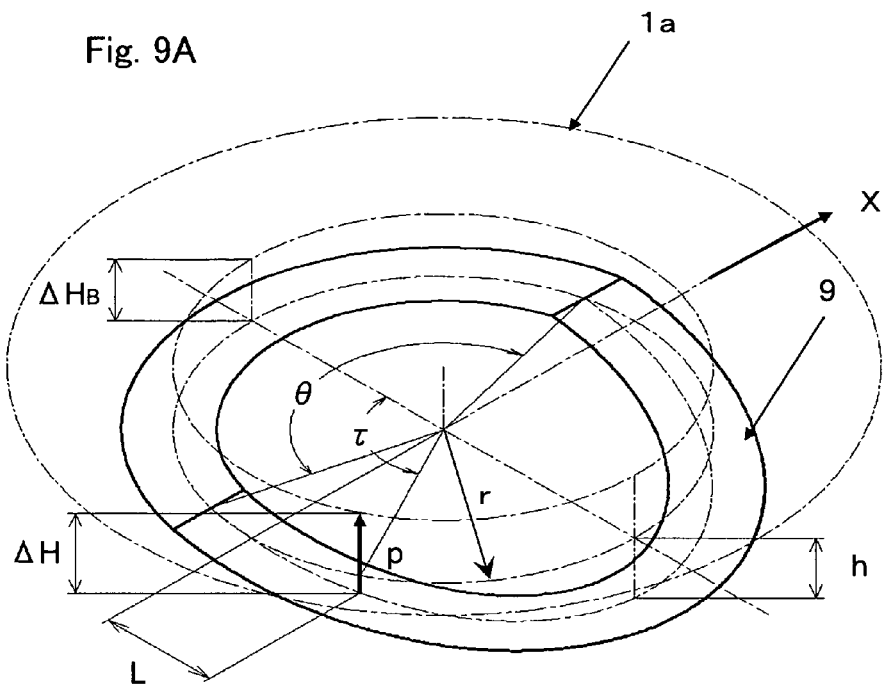
FIG. 9A shows a moment about an X axis by a dynamic pressure in the third embodiment of the present invention.

Herein, as in the second embodiment, a moment $M_X$ to be applied to the disc 1 is calculated with reference to FIG. 9A. In FIG. 8B, h represents a step between a point A located at a lowest position and a point B located at a highest position, and $\Delta H_B$ represents an axial distance between the disc 1 and the magnetic shield plate 9 at the point B. An axial distance $\Delta H$ in the inclined face 9d is expressed as follows.

$$\Delta H \cong \Delta H_B + h \frac{\left\{\cos\left(\frac{\theta}{2}\right) - \cos\tau\right\}}{\left\{1 + \cos\left(\frac{\theta}{2}\right)\right\}} \quad (6)$$

The moment $M_X$ is expressed as follows.

$$M_X \propto \int_0^{2\pi} pLr\,d\tau = 2\int_0^{\pi} pr\cos(\tau)r\,d\tau = 2r^2\int_0^{\pi} p\cos(\tau)\,d\tau \propto 2\rho * S * \quad (7)$$

$$r^2 \left[ \int_0^{\frac{\theta}{2}} \frac{\cos(\tau)}{\Delta H_B^2}\,d\tau + \int_{\frac{\theta}{2}}^{\pi} \frac{\cos(\tau)}{\left(\Delta H_B + h\frac{\left\{\cos\left(\frac{\theta}{2}\right) - \cos\tau\right\}}{\left\{1 + \cos\left(\frac{\theta}{2}\right)\right\}}\right)^2}\,d\tau \right]$$

Figure 9B:
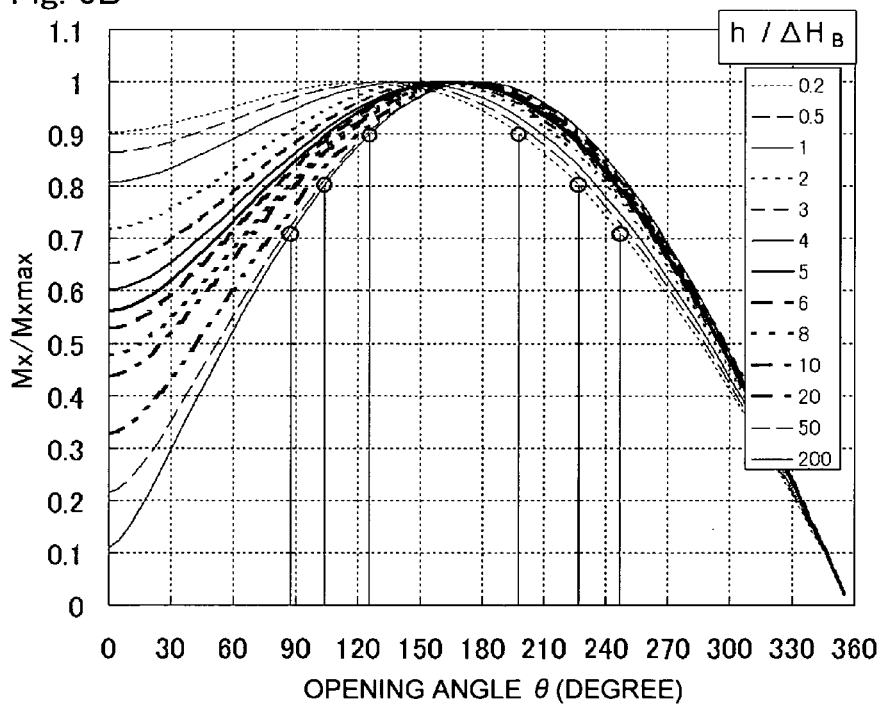
FIG. 9B shows a relation between the moment about the X axis by the dynamic pressure in the third embodiment of the present invention and an opening angle θ.

FIG. 9B shows calculation results of the expression (7). A value of $M_X/M_{Xmax}$ with respect to an opening angle θ is determined depending on a ratio between the step h and the axial distance $\Delta H_B$. With reference to FIG. 9B, a value of $h/\Delta H_B$ exerts an influence on the opening angle θ. The moment $M_X$ becomes maximum in a range between almost 150° and 180°. Herein, when the opening angle θ falls within a range between 87° and 248°, the moment $M_X$ can be increased to a value not less than 71% of the maximum value $M_{Xmax}$. When the opening angle θ falls within a range between 103° and 227°, the moment $M_X$ can be increased to a value not less than 80% of the maximum value $M_{Xmax}$. Further, when the opening angle θ falls within a range between 125° and 198°, the moment $M_X$ can be increased to a value not less than about 90% of the maximum value $M_{Xmax}$. Accordingly, the opening angle θ desirably falls within a range between not less than 87° and not more than 248°, more desirably between 103° and 227°, most desirably between 125° and 198°.

In consideration of calculation results (see FIG. 7B) in the second embodiment, if the opening angle θ falls within a range between 90° and 248°, the moment $M_X$ can be increased to a value not less than 71% of the maximum value $M_{Xmax}$. If the opening angle θ falls within a range between 106° and 227°, the moment $M_X$ can be increased to a value not less than 80% of the maximum value $M_{Xmax}$. If the opening angle θ falls within a range between 125° and 198°, the moment $M_X$ can be increased to a value not less than about 90% of the maximum value $M_{Xmax}$.

With this configuration in the third embodiment, a lateral pressure Q and a moment M each applied to a radial bearing can be made large, and a peak of a dynamic pressure becomes smooth. Therefore, the lateral pressure can be further stabilized. As a result, a behavior of a rotor can be stabilized; thus, increase in NRRO and RRO can be effectively suppressed and resistance to external forces such as vibration can be improved.

Further, a clearance can be provided between an upper side of a core winding 8 and the magnetic shield plate 9. Therefore, a flexible board can be provided at this clearance in order to perform end-line processing on the core winding 8.

In addition, the protrusion portion formed by drawing makes it possible to expect of considerable improvement in stiffness of a thin magnetic shield plate without warpage of the magnetic shield plate 9.

Fourth Embodiment

Figure 10A:
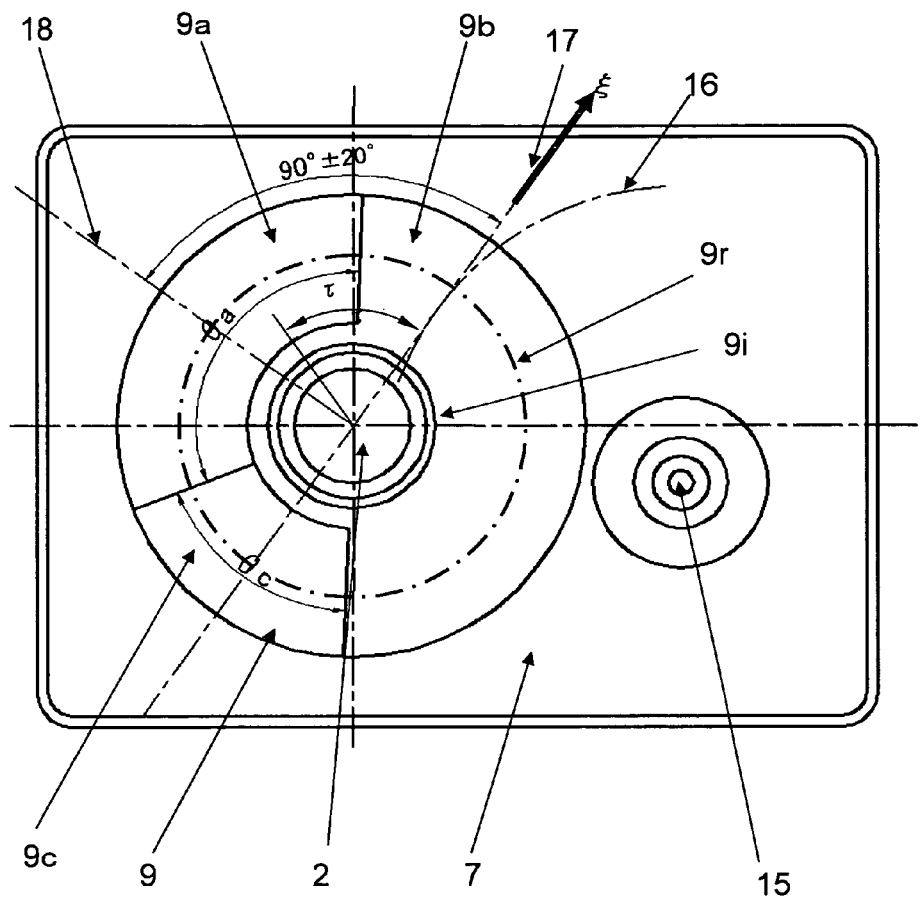
FIG. 10A is a plan view showing a disc driving motor according to a fourth embodiment of the present invention, and FIG. 10B schematically shows a second axial clearance formed between a magnetic shield plate and a disc in the fourth embodiment of the present invention in a developed manner.
Figure 10B:
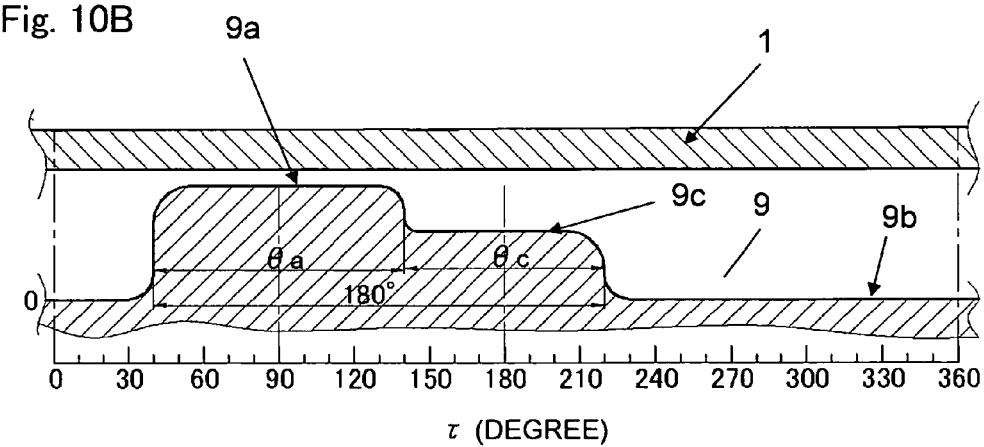
Figure 11A:
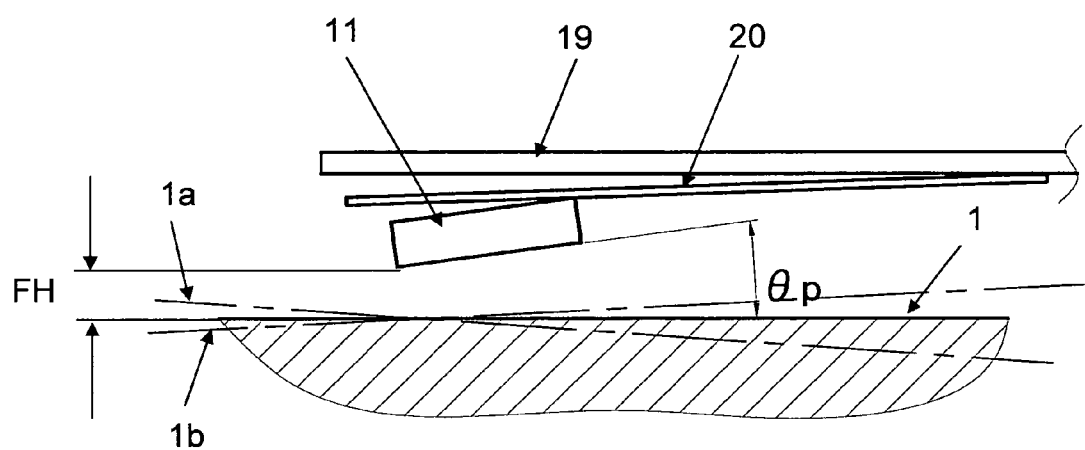
FIG. 11A shows a head pitch angle with respect to a disc.
Figure 11B:
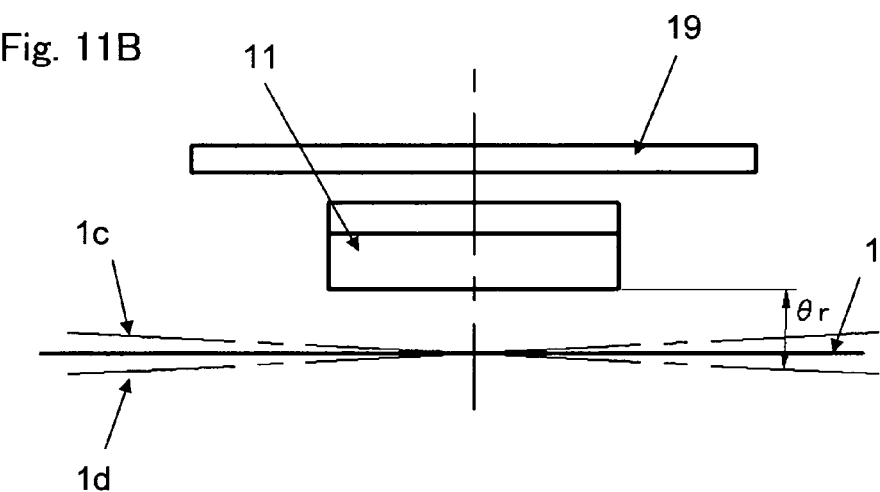
FIG. 11B shows a head roll angle with respect to the disc.
Figure 13:
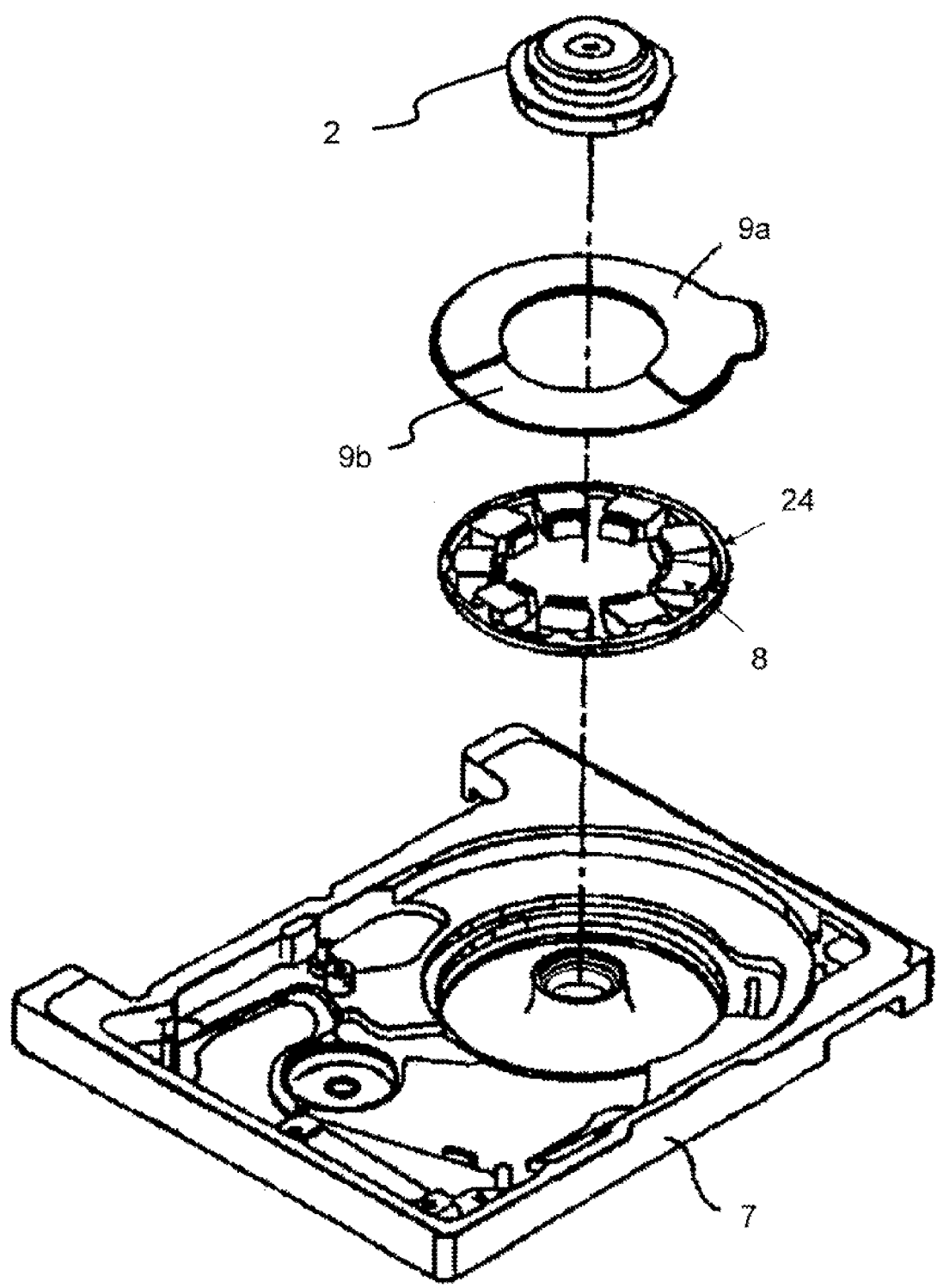
FIG. 13 is an exploded perspective view showing a motor unit of an HDD in the conventional configuration 1.
Figure 14:
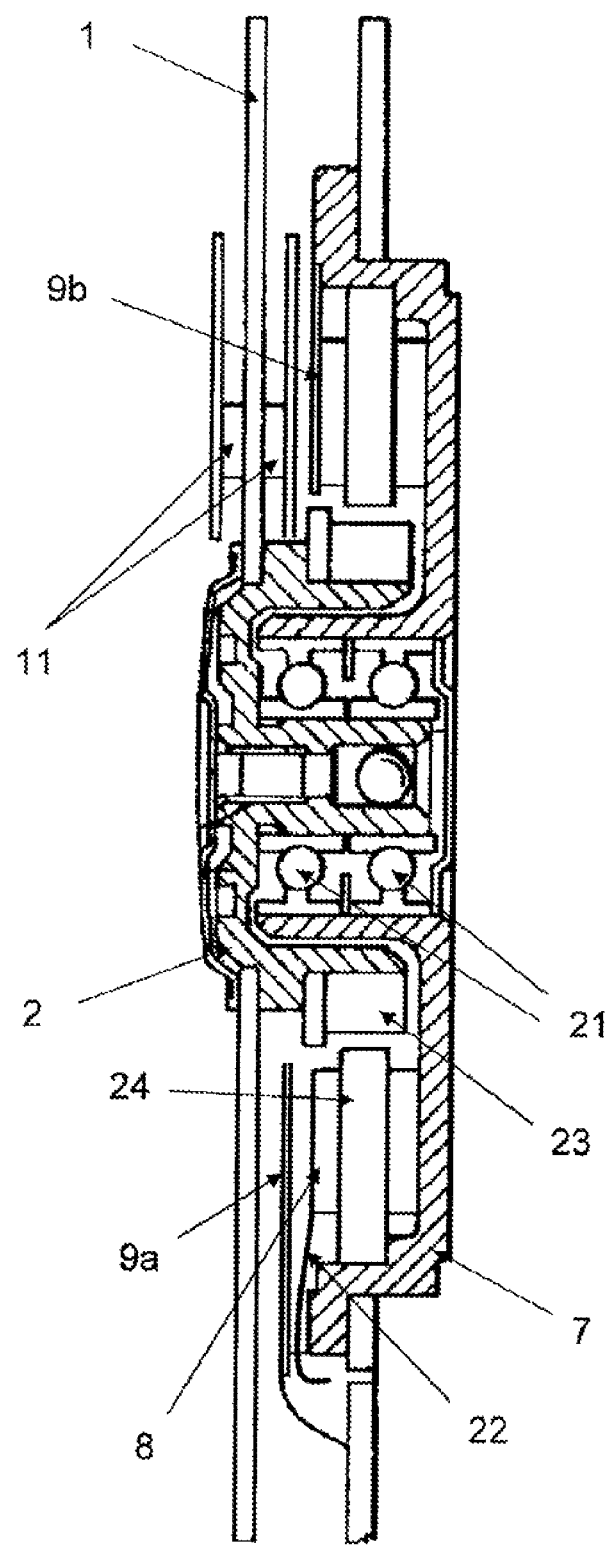
FIG. 14 is a sectional view showing the motor unit of the HDD in the conventional configuration 1.
Figure 15A:
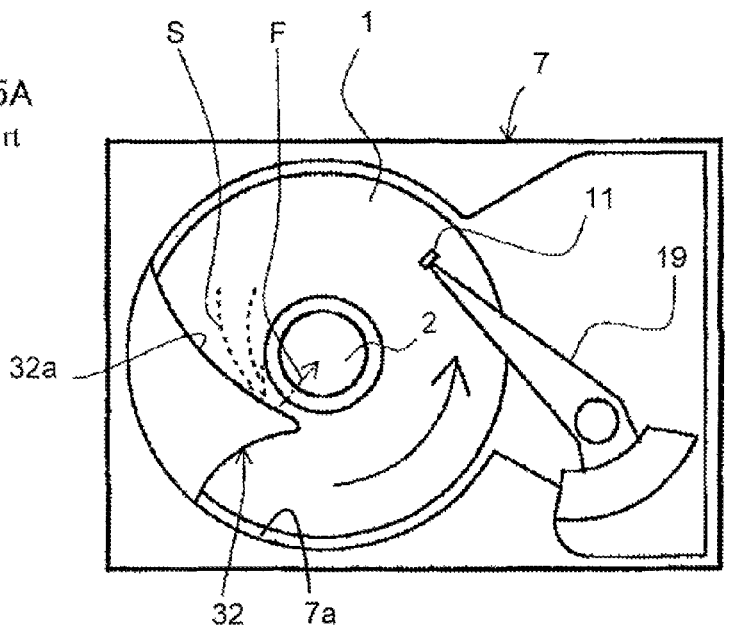
FIG. 15A is a plan view showing an HDD in the conventional configuration 2.
Figure 15B:
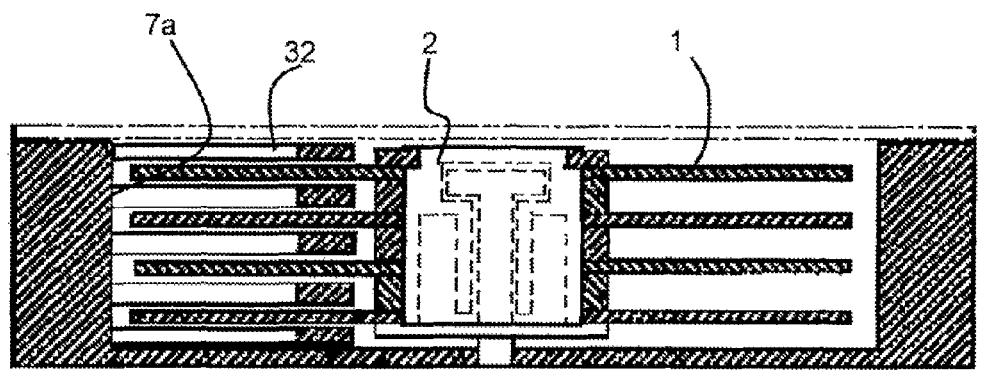
FIG. 15B is a sectional view showing the HDD in the conventional configuration 2.
Figure 16:
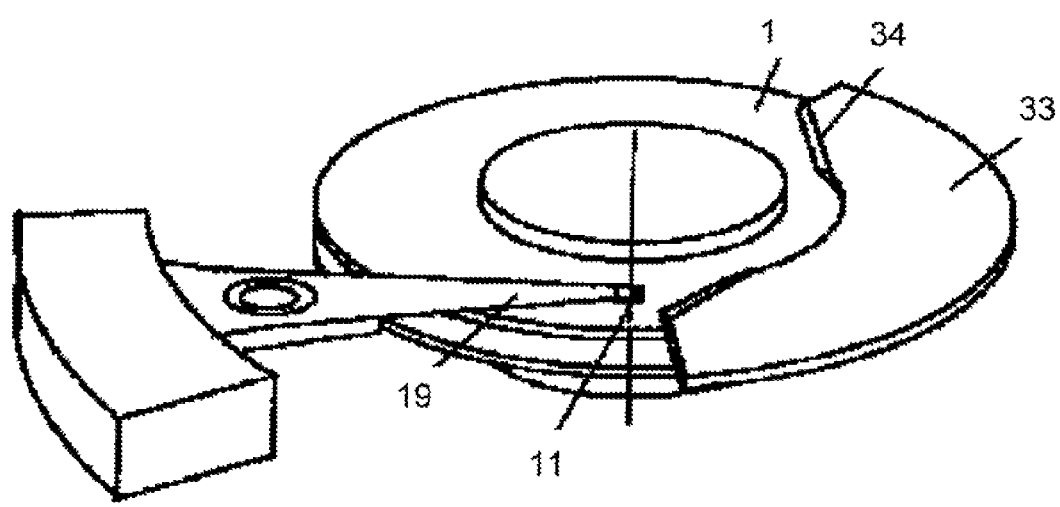
FIG. 16 is a perspective view showing an HDD in the conventional configuration 3.

FIG. 10A is a plan view showing a disc driving motor according to a fourth embodiment. FIG. 10B schematically shows a second axial clearance formed between a magnetic shield plate 9 and a disc 1 in a developed manner. FIG. 10B shows radial center portions 9r of protrusion portions 9a and 9c. In FIG. 10B, a horizontal axis represents a phase τ in a motor rotating direction. Herein, an origin of the phase τ is a tangent drawn from a rotational center of a disc with respect to a head scanning locus arc 16, that is, a direction of a head scanning locus tangent 17. The phase τ has a positive value in a direction of rotation in a counterclockwise direction from its original.

As shown in FIG. 10B, the protrusion portion 9a most close to the disc 1 protrudes at a phase (τ=90°), that is, within a range (θa≅100°) about a head scanning locus orthogonal line 18. The protrusion portion 9c is formed next to the protrusion portion 9a. Herein, the protrusion portion 9c has an opening angle θc of about 80°, and a center phase of the opening angle θc is about 180°. The opening angles θa and θc are set so as to establish the following expression.

$$\theta a + \theta c = 180°  \quad (8)$$

In the flat portion 9b, an axial clearance between the disc 1 and the magnetic shield plate 9 becomes largest.

In the radius center portion 9r of each protrusion portion of the magnetic shield plate 9, the axial clearance between the disc 1 and the magnetic shield plate 9 differs for each phase as described above. The innermost circumference portion 9i is formed into a single ring-shaped plane. More specifically, as shown in FIGS. 12B and 12C, the innermost circumference portion 9i takes a part of a plane axially identical in height to the flat portion 9b Circumferential connection portions between the protrusion portions 9a and 9c and the flat portion 9b are rounded smoothly. In FIG. 12B, a portion between the innermost circumference portion 9i and the protrusion portion 9a is steeply raised in a radial direction. However, the steep rise in the radial direction generates no vortex; therefore, no problem arises.

Hereinafter, description will be given of functional effects according to the aforementioned embodiments.

The center phase of the protrusion portion 9a where the axial clearance is narrowest is in a direction identical to the head scanning locus orthogonal line 18 orthogonal to the tangent of the head scanning locus arc 16 (that is, the head scanning locus tangent 17). Accordingly, the dynamic pressure generated at the protrusion portion 9a is mainly applied as a moment about the head scanning locus tangent 17. As a result, the rotor including the disc 1 receives a moment inclined about the head scanning locus tangent 17. In addition, the center phase of the flat portion 9b is 180° opposite to the head scanning locus tangent 17; therefore, the dynamic pressure generated at the flat portion 9b is applied to the rotor as a moment about the head scanning locus orthogonal line 18. As a result, the rotor including the disc 1 receives a moment inclined about the head scanning locus orthogonal line 18.

Herein, if such a moment is applied to the disc 1, the rotor including the disc 1 is slightly inclined about the head scanning locus tangent 17 in a stationary manner. Then, the moment is balanced when bearing reaction forces of a radial bearing and a thrust bearing change. Herein, stiffness of the bearing is improved; therefore, vibration is suppressed even when disturbance is applied to the rotor.

In general, variation in pitch angle is most important for the posture of the head 11. Therefore, it is desired that the variation in pitch angle is suppressed. In the aforementioned embodiments, the moment about the head scanning locus tangent 17 is set so as to become largest; therefore, the variation in pitch angle can be suppressed efficiently. Further, the moment about the head scanning locus orthogonal line 18 is also applied to the disc 1; therefore, variation in roll angle can be also suppressed.

With this configuration, vibration of the disc 1 can be suppressed efficiently.

Depending on a design of a slider pad (not shown) formed under the head 11, if an allowance of the variation in roll angle is smaller than an allowance of the variation in pitch angle, a region where the axial distance between the disc 1 and the magnetic shield plate 9 becomes shortest may be formed as the protrusion portion 9c. Further, the protrusion portion 9a may be equal in height to the protrusion portion 9c.

The center phase of each of the protrusion portions 9a and 9c is not necessarily to be orthogonal to or parallel to the head scanning locus tangent 17, and may be shifted from the head scanning locus tangent 17 by about 20°. Such shift exerts little influence because each of moments in a pitch angle direction and a roll angle direction when being seen from the head 11 satisfies the following expression: cos 20≅0.94.

The innermost circumference portion 9i of the magnetic shield plate 9 is formed into a single ring-shaped plane. Therefore, the innermost circumference portion 9i is axially symmetrical to the magnet 23, so that a cogging force is not generated between the innermost circumference portion 9i and the magnet 23. Thus, vibration can be suppressed and acoustic noise can be reduced.

In the first to fourth embodiments, the dynamic pressure bearing is of an axial rotation type. The configuration of the present invention can be applied as long as a hydrodynamic bearing is utilized. In addition, the magnetic circuit of an inner rotor type is used in the motor unit; however, the present invention is not limited thereto. The configuration of the present invention can be applied to a magnetic circuit of a so-called outer rotor type that an outer periphery of a magnet is fixed to an inner circumferential cylindrical face of a cylindrical yoke and a stator core having tooth is arranged radially so as to oppose an inner circumferential face of the magnet.

The radial bearing and the thrust bearing are not limited to the configurations described in the first to fourth embodiments. For example, a thrust bearing may be provided between a lower end of a hub and an upper end face of a sleeve. Alternatively, spiral dynamic pressure grooves may be directly formed on a lower end of a shaft without provision of a thrust flange.

In the aforementioned embodiments, the magnetic shield plate is subjected to pressing in order to narrow the axial clearance between the magnetic shield plate and the disc; however, the present invention is not limited thereto. For example, a protrusion portion made of a resin may be provided by integral molding on the magnetic shield plate in order to narrow the clearance between the magnetic shield plate and the disc.

The present invention is not limited to the aforementioned embodiments.

The disc driving motor and the information recording and reproducing apparatus according to the present invention exhibit the following effects. That is, a magnetic shield plate having a region where an axial clearance between the magnetic shield plate and a disc is narrow is provided under the disc so as to oppose a bottom face of the disc. A high axial dynamic pressure is generated in a predetermined phase direction between the magnetic shield plate and the disc, and a lateral pressure is applied to a hydrodynamic bearing; thus, a behavior of a rotor can be stabilized. Therefore, the disc driving motor according to the present invention is effective for a magnetic recording and reproducing apparatus such as an HDD. Further, the disc driving motor according to the present invention is applicable as a spindle motor for an optical disc drive.

What is claimed is:

1. A disc driving motor comprising:
   a base;
   a hub having a ring-shaped disc receiving face configured to have a disc placed thereon, the disc receiving face having an outer diameter;
   a hydrodynamic bearing rotatably supporting the hub;
   a motor unit mounted on the base, the motor unit having an outer diameter larger than the outer diameter of the disc receiving face, and applying a rotational force to the hub; and
   a magnetic shield plate disposed on an axial clearance formed between the disc and the motor unit when the disc is placed on the disc receiving face, wherein
   the magnetic shield plate has an opposed face, the opposed face being formed in an annular shape and being opposed to the disc when the disc is placed on the disc receiving face, and
   the entirety of the opposed face is inclined toward the disc receiving face.

2. An information recording and reproducing apparatus comprising:
   the disc driving motor according to claim 1; and
   a head disposed so as to oppose the disc, the head configured to perform scanning on the disc to thereby record and reproduce information on/from the disc.

3. The information recording and reproducing apparatus according to claim 2, wherein
   the opposed face is inclined toward the disc receiving face such that an axial distance between the magnetic shield plate and the disc over a region where the head performs no scanning is shorter than an axial distance between the magnetic shield plate and the disc over a region where the head performs scanning.

4. The information recording and reproducing apparatus according to claim 2, wherein
   the opposed face is inclined such that the axial distance becomes short toward a direction almost orthogonal to a tangent drawn from a rotational center of the disc with respect to a scanning locus arc of the head, in the axial clearance between the magnetic shield plate and the disc.

5. An information recording and reproducing apparatus comprising:
   a base;
   a hub having a ring-shaped disc receiving face configured to have a disc placed thereon, the disc receiving face having an outer diameter;
   a hydrodynamic bearing rotatably supporting the hub;
   a motor unit mounted on the base, the motor unit having an outer diameter larger than the outer diameter of the disc receiving face, and applying a rotational force to the hub;
   a head disposed so as to oppose the disc, the head configured to perform scanning on the disc to thereby record and reproduce information on/from the disc, and
   a magnetic shield plate disposed on an axial clearance formed between the disc and the motor unit when the disc is placed on the disc receiving face, wherein
   the magnetic shield plate has an opposed face opposed to the disc when the disc is placed on the disc receiving face;
   the opposed face is inclined toward the disc receiving face, and
   the opposed face is inclined such that the axial distance becomes short toward a direction almost orthogonal to a tangent drawn from a rotational center of the disc with respect to a scanning locus arc of the head, in the axial clearance between the magnetic shield plate and the disc.

* * * * *